US012803719B2

(12) United States Patent
Park et al.

(10) Patent No.: US 12,803,719 B2
(45) Date of Patent: Nov. 17, 2026

(54) METHOD AND APPARATUS FOR UPLINK TRANSMISSION IN WIRELESS COMMUNICATION SYSTEM

(71) Applicant: KT CORPORATION, Gyeonggi-do (KR)

(72) Inventors: Ki-Hyeon Park, Gyeonggi-do (KR); Kyujin Park, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 286 days.

(21) Appl. No.: 18/637,834

(22) Filed: Apr. 17, 2024

(65) Prior Publication Data

US 2024/0372653 A1 Nov. 7, 2024

(30) Foreign Application Priority Data

May 2, 2023 (KR) ........................ 10-2023-0057011
Dec. 19, 2023 (KR) ........................ 10-2023-0185776

(51) Int. Cl.
*H04L 1/1829* (2023.01)
*H04L 1/1607* (2023.01)

(52) U.S. Cl.
CPC .......... *H04L 1/1854* (2013.01); *H04L 1/1671* (2013.01)

(58) Field of Classification Search
CPC ... H04L 1/1854; H04L 1/1671; H04L 1/1861; H04W 72/115; H04W 72/121
See application file for complete search history.

(56) References Cited

U.S. PATENT DOCUMENTS

2024/0276497 A1* 8/2024 Xu ...................... H04W 72/115
2025/0330976 A1* 10/2025 Li ......................... H04L 1/1812

FOREIGN PATENT DOCUMENTS

WO WO-2024157431 A1 * 8/2024 ............. H04L 5/001

OTHER PUBLICATIONS

Huawei et al., "Discussion on CG enhancements for XR capacity", R1-2302346, 3GPP TSG-RAN WG1 Meeting #112bis-e, E-Meeting, Apr. 17-26, 2023.
European Patent Office, Extended European Search Report of corresponding EP Patent Application No. 24171611.7, Sep. 23, 2024.

* cited by examiner

*Primary Examiner* — Khoa Huynh
(74) *Attorney, Agent, or Firm* — IP Legal Services, LLC

(57) ABSTRACT

Provided are a method and apparatus for operating in a wireless communication system. A base station may configure a physical uplink shared channel (PUSCH) to a terminal and configure and transmit unused transmission occasion (UTO)-uplink control information (UCI) for indicating an unused transmission occasion to the terminal. The terminal applies the configuration thereto. The terminal transmits the UTO-UCI and hybrid automatic repeat and request (HARQ) information together to the base station through the PUSCH, in which the UTO-UCI and the HARQ are transmitted together based on a first priority of the HARQ information.

12 Claims, 16 Drawing Sheets

METHOD AND APPARATUS FOR UPLINK TRANSMISSION IN WIRELESS COMMUNICATION SYSTEM

CROSS-REFERENCE TO RELATED THE APPLICATION

This application is based on and claims priority under 35 U.S.C. § 119 to Patent Application No. 10-2023-0057011 filed on May 2, 2023 and No. 10-2023-0185776 filed on Dec. 19, 2023 in the Korean Intellectual Property Office, the disclosures of which are incorporated by reference herein in their entirety.

BACKGROUND

Technical Field

The present disclosure relates to a $5^{th}$ generation new radio (5GNR) system based on the $3^{rd}$ generation partnership project (3GPP).

Description of the Related Art

With the increase in the number of communication devices, there is a consequent rise in communication traffic that needs to be managed. To handle this increased communication traffic, a next generation 5G system, which is an enhanced mobile broadband communication system compared to the exiting LTE system, has become necessary. Such a next generation 5G system has been developed based on scenarios which are classified into Enhanced Mobile BroadBand (eMBB), Ultra-reliability and low-latency communication (URLLC), Massive Machine-Type Communications (mMTC), and the like.

eMBB, URLLC, and mMTC are represent next generation mobile communication scenarios. eMBB is characterized by high spectrum efficiency, high user experienced data rate, high peak data. URLLC is characterized by ultra-reliable, ultra-low latency, ultra-high availability (e.g., vehicle-to-everything (V2X), Emergency Service, Remote Control). mMTC is characterized by low cost, low energy, short packet, and massive connectivity (e.g., Internet of Things (IoT)).

SUMMARY

The disclosure provides a method and apparatus for controlling uplink transmission in a wireless communication system. In particular, the disclosure provides a method and apparatus for performing efficient uplink transmission through a configured physical uplink shared channel (PUSCH) when PUSCH transmission is configured.

According to an embodiment, there is provided a method of a terminal for configuring a physical uplink shared channel (PUSCH) in a wireless communication system. The method may include configuring unused transmission occasion (UTO)-uplink control information (UCI) for indicating an unused transmission occasion of the PUSCH, transmitting the UTO-UCI and hybrid automatic repeat and request (HARQ) information together through the PUSCH, wherein the UTO-UCI and the HARQ are transmitted together based on a first priority of the HARQ information.

According to another embodiment, there is provided a method of a base station for performing configuration for a physical uplink shared channel (PUSCH) to a terminal in a wireless communication system. The method may include configuring and transmitting unused transmission occasion (UTO)-uplink control information (UCI) for indicating an unused transmission occasion of the PUSCH to the terminal, and receiving the UTO-UCI and hybrid automatic repeat and request (HARQ) information together through the PUSCH, wherein the UTO-UCI and the HARQ are received together based on a first priority of the HARQ information.

According to further another embodiment, there is provided a communication device in a wireless communication system. The communication device may include: at least one processor; and at least one memory configured to store instructions and be operably electrically connectable to the at least one processor, wherein an operation performed based on the instruction executed by the at least one processor includes configuring a physical uplink shared channel (PUSCH), configuring unused transmission occasion (UTO)-uplink control information (UCI) for indicating an unused transmission occasion of the PUSCH, and transmitting the UTO-UCI and hybrid automatic repeat and request (HARQ) information together through the PUSCH, wherein the UTO-UCI and the HARQ are transmitted together based on a first priority of the HARQ information.

According to still another embodiment, there is provided a base station in a wireless communication system. The base station may include: at least one processor; and at least one memory configured to store instructions and be operably electrically connectable to the at least one processor, wherein an operation performed based on the instruction executed by the at least one processor includes: performing configuration for a physical uplink shared channel (PUSCH) to a terminal, configuring and transmitting unused transmission occasion (UTO)-uplink control information (UCI) for indicating an unused transmission occasion of the PUSCH is configured to the terminal, and receiving the UTO-UCI and hybrid automatic repeat and request (HARQ) information together through the PUSCH, wherein the UTO-UCI and the HARQ are received together based on a first priority of the HARQ information.

Uplink data may be transmitted, by terminal to the base station, together with the UTO-UCI and the HARQ information.

For example, the UTO-UCI and the HARQ information may be transmitted together further based on a second priority corresponding to at least one that is transmitted with the HARQ information together. Here, the first priority may be the same as the second priority.

As another example, the UTO-UCI and the HARQ information may be transmitted together further based on a second priority of the UTO-UCI. Here, the first priority may be the same as the second priority.

Meanwhile, the UTO-UCI may be sequentially allocated to resources of the first symbol in a slot, that are not allocated to a demodulation-reference signal (DM-RS), within a transmission space allocated for the PUSCH and if no resources remain in the first symbol, the allocation of the UTO-UCI continuous consecutively to resources of at least one subsequent symbol where the DM-RS is not allocated. The uplink data may be allocated to any remaining resources that are not allocated to either the DM-RS or the UTO-UCI.

The HARQ information and the UTO-UCI may be transmitted as encoded together.

DETAILED DESCRIPTION

Figure 1:
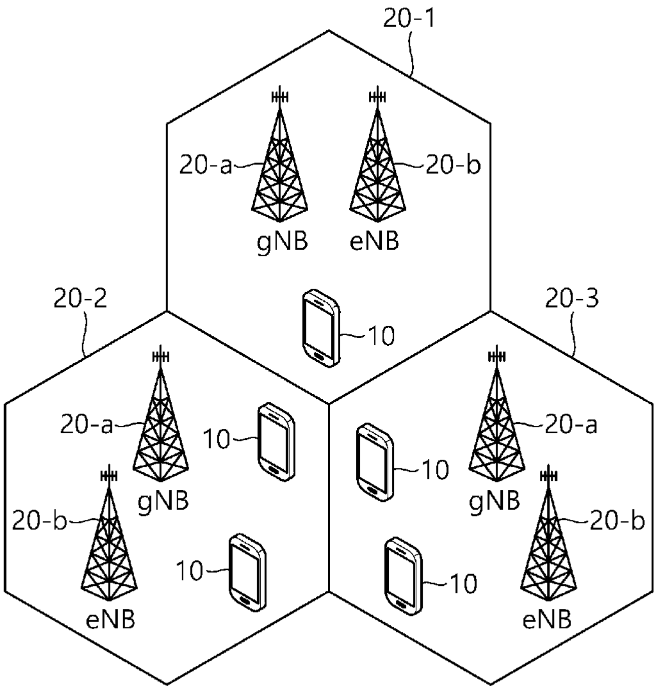
FIG. 1 is a diagram illustrating a wireless communication system.

The technical terms used in this document are for merely describing specific embodiments and should not be considered limiting the embodiments of disclosure. Unless defined otherwise, the technical terms used in this document should be interpreted as commonly understood by those skilled in the art but not too broadly or too narrowly. If any technical terms used here do not precisely convey the intended meaning of the disclosure, they should be replaced with or interpreted as technical terms that accurately understood by those skilled in the art. The general terms used in this document should be interpreted according to their dictionary definitions, without overly narrow interpretations.

The singular form used in the disclosure includes the plural unless the context dictates otherwise. The term 'include' or 'have' may represent the presence of features, numbers, steps, operations, components, parts or the combination thereof described in the disclosure. The term 'include' or 'have' may not exclude the presence or addition of another feature, another number, another step, another operation, another component, another part or the combination thereof.

The terms 'first' and 'second' are used to describe various components without limiting them to these specific terms. The terms 'first' and 'second' are only used to distinguish one component from another component. For example, a first component may be named as a second component without departing from the scope of the disclosure.

When an element or layer is referred to as being "connected to" or "coupled to" another element or layer, it may be directly connected or coupled to the other element or layer, there might be intervening elements or layers. In contrast, when an element or layer is referred to as being "directly connected to" or "directly coupled to" another element or layer, there are no intervening elements or layers.

Hereinafter, the exemplary embodiments of the disclosure will be described in detail with reference to the accompanying drawings. In describing the disclosure, for ease of understanding, the same reference numerals will be used throughout the drawings for the same components, and repetitive description on these components will be omitted. Detailed description on well-known arts that may obscure the essence of the disclosure will be omitted. The accompanying drawings are provided to merely facilitate understanding of the embodiment of disclosure and should not be seen as limiting. It should be recognized that the essence of this disclosure extends the illustrations, encompassing, replacements or equivalents in variations of what is shown in the drawings.

In this disclosure, "A or B" may mean "only A", "only B", or "both A and B". In other words, "A or B" in the disclosure may be interpreted as "A and/or B". For example, "A, B or C" may mean "only A", "only B", "only C", or "any combination of A, B and C".

In this disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In this disclosure, "at least one of A and B" may mean "only A", "only B" or "both A and B". In addition, "at least one of A or B" or "at least one of A and/or B" may be interpreted as the same as "at least one of A and B".

In addition, "at least one of A, B and C" may mean "only A", "only B", "only C", or "any combination of A, B and C". Further, "at least one of A, B or C" or "at least one of A, B and/or C" may mean "at least one of A, B and C".

Also, parentheses used in this disclosure may mean "for example". For example, "control information (PDCCH)" may mean that "PDCCH" is an example of "control information". However, "control information" in this disclosure is not limited to "PDCCH". As another example, "control information (i.e., PDCCH)", may also mean that "PDCCH" is an example of "control information".

Each of the technical features described in one drawing in this disclosure may be implemented independently or simultaneously.

In the accompanying drawings, user equipment (UE) is illustrated as an example and may be referred to as a terminal, mobile equipment (ME), and the like. UE may be a portable device such as a laptop computer, a mobile phone, a personal digital assistance (PDA), a smart phone, a multimedia device, or the like. UE may be a non-portable device such as a personal computer (PC) or a vehicle-mounted device.

Hereinafter, the UE may be as an example of a device capable of wireless communication. The UE may be referred to as a wireless communication device, a wireless device, or a wireless apparatus. The operation performed by the UE may be applicable to any device capable of wireless communication. A device capable of wireless communication may also be referred to as a radio communication device, a wireless device, or a wireless apparatus.

A base station generally refers to a fixed station that communicates with a wireless device. The base station may include an evolved-NodeB (eNodeB), an evolved-NodeB (eNB), a BTS (Base Transceiver System), an access point (Access Point), gNB (Next generation NodeB), RRH (remote radio head), TP (transmission point), RP (reception point), and the repeater (relay).

While embodiments of the disclosure are described based on an long term evolution (LTE) system, an LTE-advanced (LTE-A) system, and an new radio (NR) system, such embodiments may be applicable to any communication system that fits the described criteria.

<Wireless Communication System>

With the success of long-term evolution (LTE)/LTE-A (LTE-Advanced) for the 4th generation mobile communication, the next generation mobile communication (e.g., 5th generation: also known as 5G mobile communication) has been commercialized and the follow-up studies are also ongoing.

The 5th generation mobile communications, as defined by the International Telecommunication Union (ITU), provide a data transmission rate of up to 20 Gbps and a minimum actual transmission rate of at least 100 Mbps anywhere. The official name of the 5th generation mobile telecommunications is 'IMT-2020'.

ITU proposes three usage scenarios: enhanced Mobile Broadband (eMBB), massive Machine Type Communication (mMTC) and Ultra Reliable and Low Latency Communications (URLLC).

URLLC is a usage scenario requiring high reliability and low latency. For example, services such as automatic driving, factory automation, augmented reality require high reliability and low latency (e.g., a delay time of less than 1 ms). The delay time of current 4G (e.g., LTE) is statistically about 21 to 43 ms (best 10%) and about 33 to 75 ms (median), which insufficient to support services requiring a delay time of about 1 ms or less. Meanwhile, eMBB is a usage scenario that requires mobile ultra-wideband.

That is, the 5G mobile communication system offers a higher capacity compared to current 4G LTE. The 5G mobile communication system may be designed to increase the density of mobile broadband users and support device to device (D2D), high stability, and machine type communication (MTC). 5G research and development focus on achieving lower latency times and lower battery consumption compared to 4G mobile communication systems, enhancing the implementation of the Internet of things (IoTs). A new radio access technology, known as new RAT or NR, may be introduced for such 5G mobile communication.

An NR frequency band is defined to include two frequency ranges FR1 and FR2. Table 1 below shows an example of the two frequency ranges FR1 and FR2. However, the numerical values associated with each frequency range may be subject to change, and the embodiments are not limited thereto. For convenience of description, FR1 in the NR system may refer to a Sub-6 GHz range, and FR2 may refer to an above-6 GHz range, which may be called millimeter waves (mmWs).

TABLE 1

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The numerical values of the frequency ranges may be subject to change in the NR system. For example, FR1 may range from about 410 MHz to 7125 MHz as listed in [Table 1]. That is, FR1 may include a frequency band of 6 GHz (or 5850, 5900, and 5925 MHz) or higher. For example, the frequency band of 6 GHz (or 5850, 5900, and 5925 MHz) or higher may include an unlicensed band. The unlicensed band may be used for various purposes, for example, vehicle communication (e.g., autonomous driving).

The 3GPP communication standards define downlink (DL) physical channels and DL physical signals. DL physical channels are related to resource elements (REs) that convey information from a higher layer while DL physical signals, used in the physical layer, correspond to REs that do not carry information from a higher layer. For example, DL physical channels include physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH). DL physical signals include reference signals (RSs) and synchronization signals (SSs). Areference signal (RS) is also known as a pilot signal and has a predefined special waveform known to both a gNode B (gNB) and a UE. For example, DL RSs include cell specific RS, UE-specific RS (UE-RS), positioning RS (PRS), and channel state information RS (CSI-RS). The 3GPP LTE/LTE-A standards also define uplink (UL) physical channels and UL physical signals. UL channels correspond to REs with information from a higher layer. UL physical signals are used in the physical layer and correspond to REs which do not carry information from a higher layer. For example, UL physical channels include physical uplink shared channel (PUSCH), physical uplink control channel (PUCCH), and physical random access channel (PRACH). UL physical signals include a demodulation reference signal (DMRS) for a UL control/data signal, and a sounding reference signal (SRS) used for UL channel measurement.

In this disclosure, PDCCH/PCFICH/PHICH/PDSCH refers to a set of time-frequency resources or a set of REs carrying downlink control information (DCI)/a control format indicator (CFI)/a DL acknowledgement/negative acknowledgement (ACK/NACK)/DL data. Further, PUCCH/PUSCH/PRACH refers to a set of time-frequency resources or a set of REs carrying UL control information (UCI)/UL data/a random access signal.

FIG. 1 is a Diagram Illustrating a Wireless Communication System.

Referring to FIG. 1, the wireless communication system may include at least one base station (BS). For example, the BSs may include a gNodeB (or gNB) 20*a* and an eNodeB (or eNB) 20*b*. The gNB 20*a* supports 5G mobile communication. The eNB 20*b* supports 4G mobile communication, that is, long term evolution (LTE).

Each BS 20*a* and 20*b* provides a communication service for a specific geographic area (commonly referred to as a cell) (20-1, 20-2, 20-3). The cell may also be divided into a plurality of areas (referred to as sectors).

A user equipment (UE) typically belongs to one cell, and the cell to which the UE belongs is called a serving cell. Abase station providing a communication service to a serving cell is referred to as a serving base station (serving BS). Since the wireless communication system is a cellular system, there are other cells adjacent to the serving cell. The other cell adjacent to the serving cell is referred to as a neighbor cell. A base station that provides a communication service to a neighboring cell is referred to as a neighbor BS. The serving cell and the neighboring cell are relatively determined based on the UE.

Hereinafter, downlink means communication from the base station 20 to the UE 10, and uplink means communication from the UE 10 to the base station 20. In the downlink, a transmitter may be a part of the base station 20, and a receiver may be a part of the UE 10. In the uplink, the transmitter may be a part of the UE 10, and the receiver may be a part of the base station 20.

In a wireless communication system, there are primarily two schemes: frequency division duplex (FDD) scheme and time division duplex (TDD) scheme. In the FDD scheme, uplink transmission and downlink transmission occur on different frequency bands. Conversely, the TDD scheme allows both uplink transmission and downlink transmission to use the same frequency band, but at different times. A key characteristic of the TDD scheme is the substantial reciprocity of the channel response, meaning that the downlink channel response and the uplink channel response are almost identical within a given frequency domain. This reciprocity in TDD-based radio communication systems enables the estimation of the downlink channel response from the uplink channel response. In the TDD scheme, since uplink transmission and downlink transmission are time-divided in the entire frequency band, it is not possible to simultaneously perform downlink transmission by the base station and uplink transmission by the UE. In a TDD system where uplink transmission and downlink transmission are divided into subframe units, uplink transmission and downlink transmission are performed in different subframes.

Figure 2:
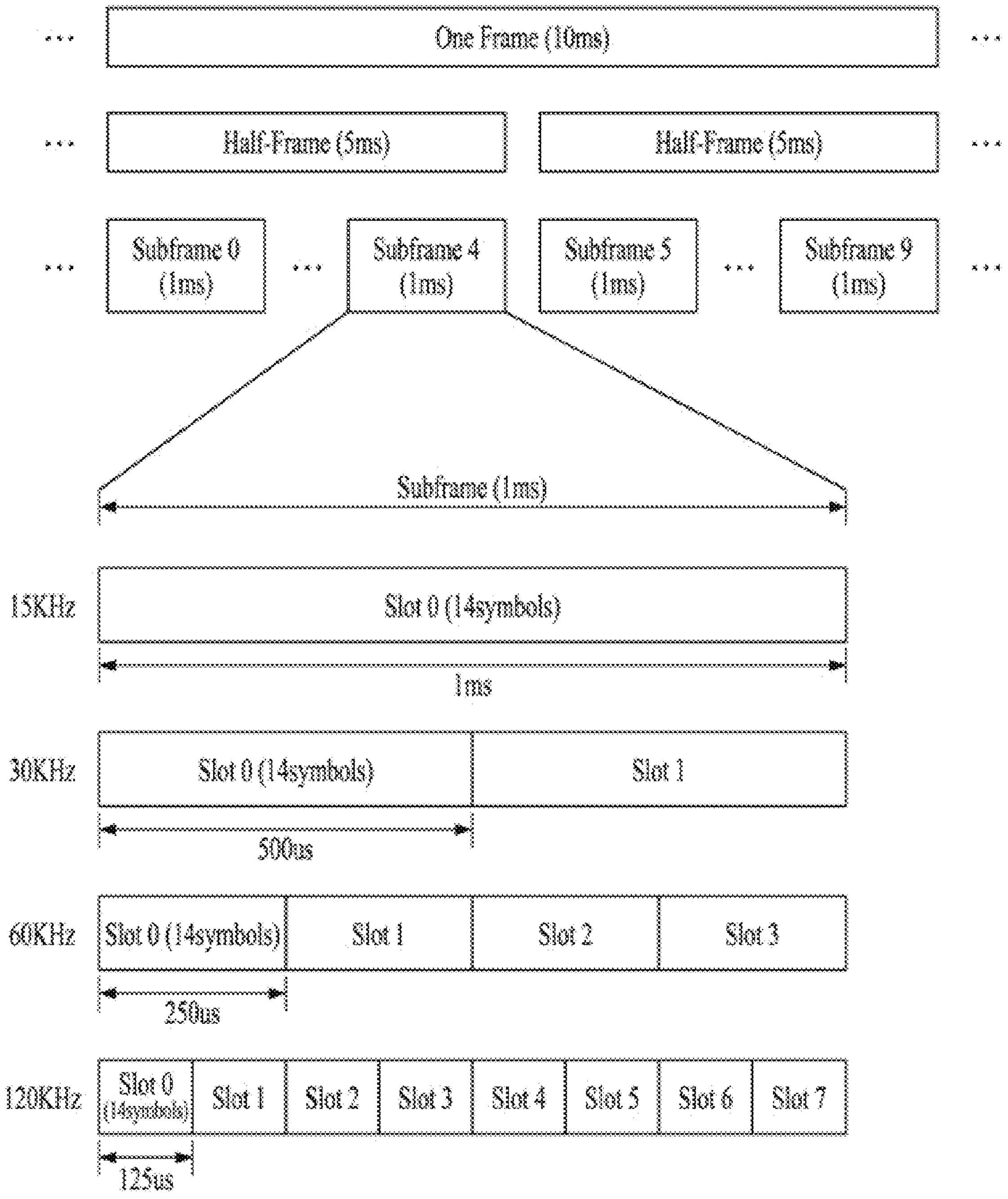
FIG. 2 is a diagram illustrating a structure of a radio frame used in new radio (NR).

FIG. 2 is a Diagram Illustrating a Structure of a Radio Frame Used in New Radio (NR).

In NR, UL and DL transmissions are configured in frames. Each radio frame has a length of 10 ms and is divided into two 5-ms half frames (HFs). Each half frame is divided into five 1-ms subframes. A subframe is divided into one or more slots, and the number of slots in a subframe depends on the subcarrier spacing (SCS). Each slot includes 12 or 14 OFDM(A) symbols according to a Cyclic Prefix (CP). With a normal CP, a slot includes 14 OFDM symbols. With an extended CP, a slot includes 12 OFDM symbols. A symbol may include an OFDM symbol (CP-OFDM symbol) and an SC-FDMA symbol (or DFT-s-OFDM symbol).

<Support of Various Numerologies>

As wireless communication technology advances, the NR system may offer various numerologies to terminals. For example, when a subcarrier spacing (SCS) is set at 15 kHz, it supports a broad range of the typical cellular bands. When a subcarrier spacing (SCS) is set at 30 kHz/60 kHz, it supports a dense-urban, lower latency, wider carrier bandwidth. When the SCS is 60 kHz or higher, it supports a bandwidth greater than 24.25 GHz in order to overcome phase noise.

These numerologies may be defined by the cyclic prefix (CP) length and the SCS. A single cell in the NR system is capable of providing multiple numerologies to terminals. Table 2 below shows the relationship between the subcarrier spacing, corresponding CP length, and the index of a numerology (represented by a).

TABLE 2

| $\mu$ | $\Delta f = 2^{\mu} \cdot 15$ [kHz] | CP |
|---|---|---|
| 0 | 15 | normal |
| 1 | 30 | normal |
| 2 | 60 | normal, extended |
| 3 | 120 | normal |
| 4 | 240 | normal |
| 5 | 480 | normal |
| 6 | 960 | normal |

Table 3 below shows the number of OFDM symbols per slot ($N^{slot}_{symb}$), the number of slots per frame ($N^{frame,\mu}_{slot}$), and the number of slots per subframe ($N^{sublame,\mu}_{slot}$) according to each numerology expressed by t in the case of a normal CP.

TABLE 3

| $\mu$ | $\Delta f = 2^{\mu} \cdot 15$ [kHz] | $N^{slot}_{symb}$ | $N^{frame,\mu}_{slot}$ | $N^{subframe,\mu}_{slot}$ |
|---|---|---|---|---|
| 0 | 15 | 14 | 10 | 1 |
| 1 | 30 | 14 | 20 | 2 |
| 2 | 60 | 14 | 40 | 4 |
| 3 | 120 | 14 | 80 | 8 |
| 4 | 240 | 14 | 160 | 16 |
| 5 | 480 | 14 | 320 | 32 |
| 6 | 960 | 14 | 640 | 64 |

Table 4 below shows the number of OFDM symbols per slot ($N^{slot}_{symb}$), the number of slots per frame ($N^{frame,\mu}_{slot}$), and the number of slots per subframe ($N^{sublame,\mu}_{slot}$) of a numerology represented by $\mu$ in the case of an extended CP.

TABLE 4

| $\mu$ | SCS ($15*2^{u}$) | $N^{slot}_{symb}$ | $N^{frame,\mu}_{slot}$ | $N^{subframe,\mu}_{slot}$ |
|---|---|---|---|---|
| 2 | 60 KHz (u = 2) | 12 | 40 | 4 |

In the NR system, OFDM(A) numerologies (e.g., SCS, CP length, and so on) may be configured differently across multiple cells that are integrated with a single terminal. Accordingly, the duration of time resource may vary among these integrated cells. Here, the duration may be referred to as a section. The time resource may include a subframe, a slot or a transmission time interval (TTI). Further, the time resource may be collectively referred to as a time unit (TU) for simplicity and include the same number of symbols.

Figure 3A:
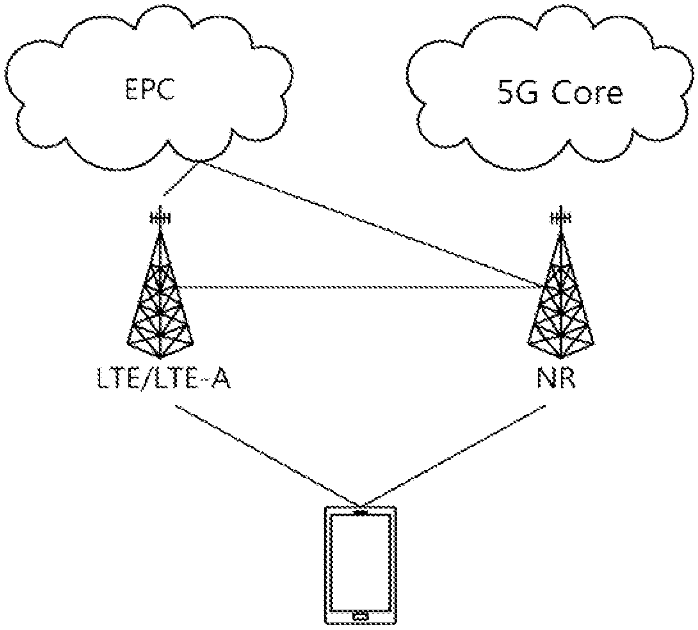
FIGS. 3A to 3C illustrate exemplary architectures for a wireless communication service.
Figure 3B:
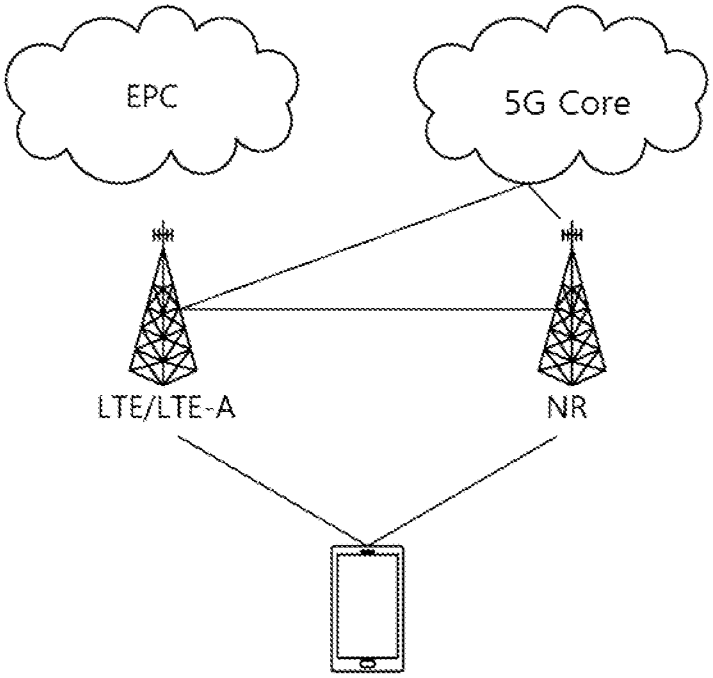
Figure 3C:
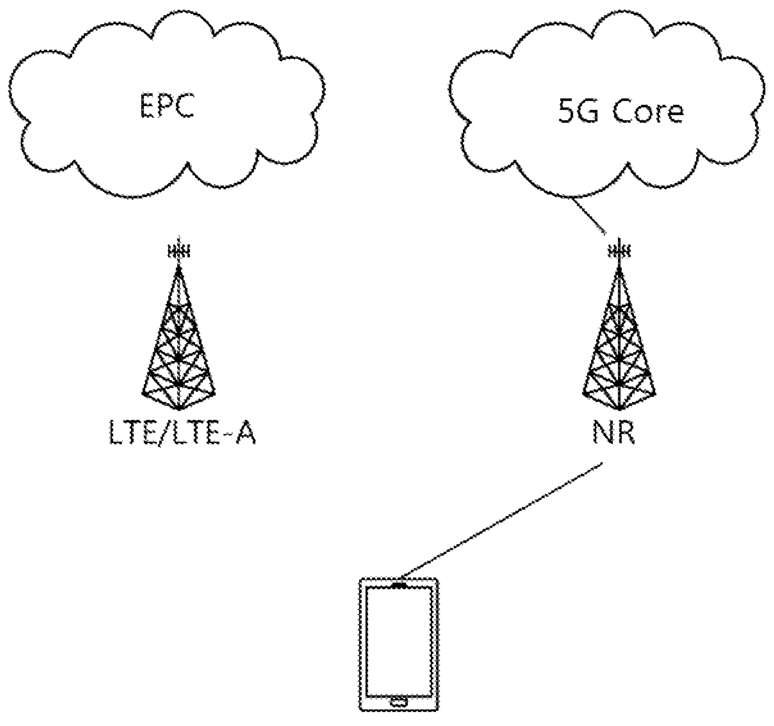

FIGS. 3A to 3C Illustrate Exemplary Architectures for a Wireless Communication Service.

Referring to FIG. 3A, a UE is connected in dual connectivity (DC) with an LTE/LTE-A cell and a NR cell.

The NR cell is connected with a core network for the legacy fourth-generation mobile communication, that is, Evolved Packet core (EPC).

Referring to FIG. 3B, the LTE/LTE-A cell is connected with a core network for 5th generation mobile communication, that is, a 5G core network.

A service provided by the architecture shown in FIGS. 3A and 3B is referred to as a non-standalone (NSA) service.

Referring to FIG. 3C, a UE is connected only with an NR cell. A service provided by this architecture is referred to as a standalone (SA) service.

In the new radio access technology (NR), the use of a downlink subframe for reception from a base station and an uplink subframe for transmission to the base station may be employed. This method may be applicable to both paired spectrums and unpaired spectrums. Paired spectrums involve two subcarriers designated for downlink and uplink operations. For example, one subcarrier within a pair of spectrums may include a pair of a downlink band and an uplink band.

Figure 4:
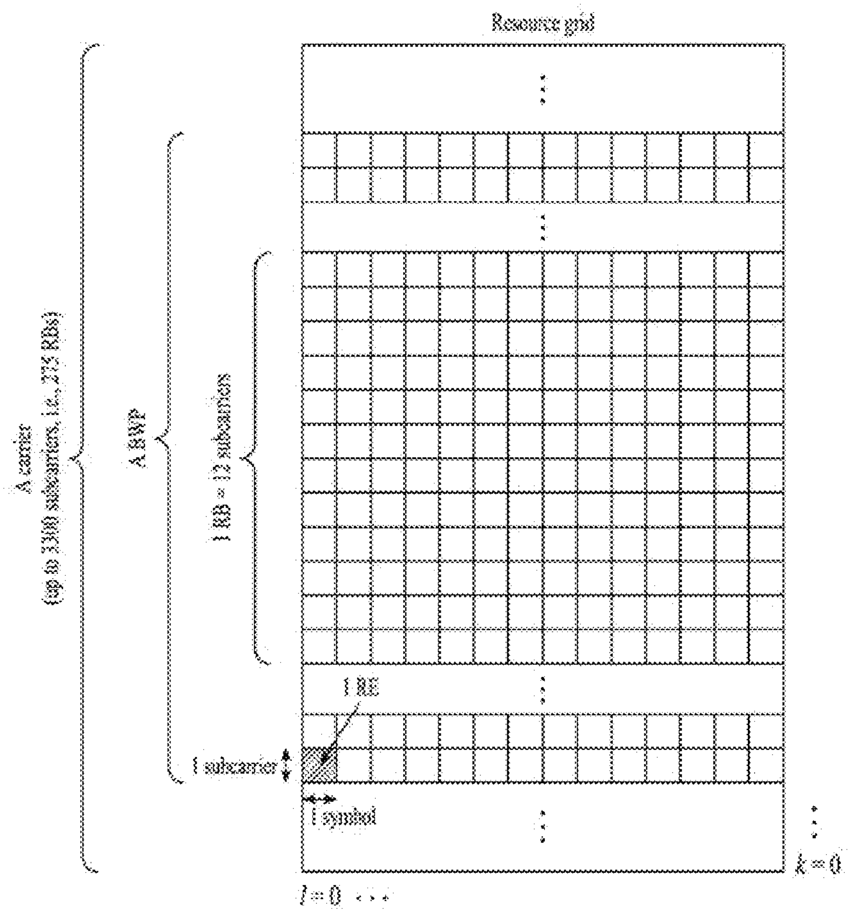
FIG. 4 illustrates a slot structure of an NR frame.

FIG. 4 Illustrates a Slot Structure of an NR Frame.

A slot in the NR system includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a set of consecutive subcarriers (e.g., 12 consecutive subcarriers) in the frequency domain. A bandwidth part (BWP) is defined as a sequence of consecutive physical resource blocks (PRBs) in the frequency domain and may be associated with a specific numerology (e.g., SCS, CP length, etc.). A terminal may be configured with up to N (e.g., five) BWPs in each of downlink and uplink. Downlink or uplink transmission is performed through an activated BWP. Among the BWPs configured for the terminal, only one BWP may be activated at a given time. In the resource grid, each element is referred to as a resource element (RE), and one complex symbol may be mapped thereto.

Figure 5:
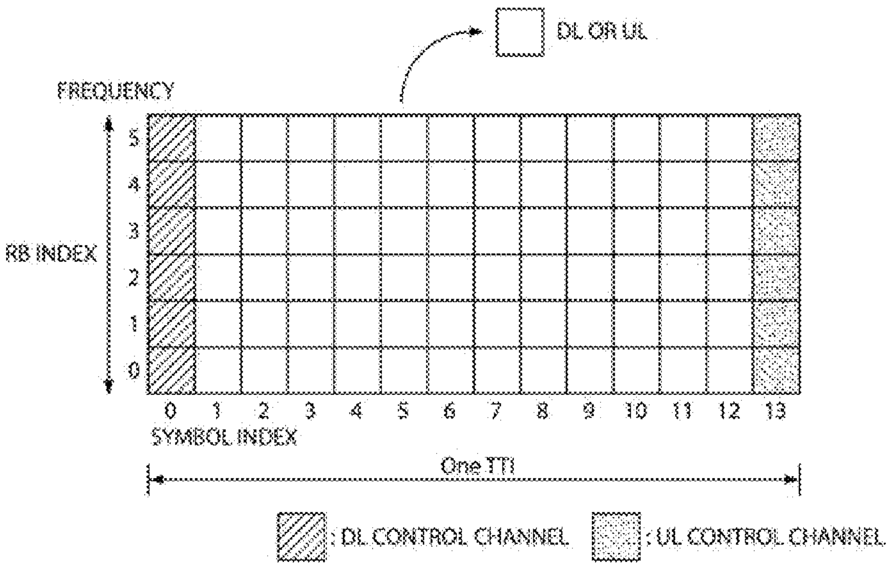
FIG. 5 shows an example of a subframe type in NR.

FIG. 5 Shows an Example of a Subframe Type in NR.

In NR (or new RAT), a Transmission Time Interval (TTI), as shown in FIG. 5, may be referred to as a subframe or slot. The subframe (or slot) may be utilized in a TDD system to minimize data transmission delay. As shown in FIG. 5, a subframe (or slot) includes 14 symbols. The symbol at the head of the subframe (or slot) may be allocated for a DL control channel, and the symbol at the end of the subframe (or slot) may be assigned for a UL control channel. The remaining symbols may be used for either DL data transmission or UL data transmission. This subframe (or slot) structure allows sequential downlink and uplink transmissions in one single subframe (or slot). Accordingly, downlink data may be received in a subframe (or slot) and uplink ACK/NACK may be transmitted in the same subframe (or slot).

Such a subframe (or slot) structure may be referred to as a self-contained subframe (or slot).

The first N symbols in a slot may be used to transmit a DL control channel and referred to as a DL control region, hereinafter. The last M symbols in the slot may be used to transmit a UL control channel and referred to as a UL control region. N and M are integers greater than 0. A resource region between the DL control region and the UL control region may be used for either DL data transmission or UL data transmission and referred to as a data region. For example, a physical downlink control channel (PDCCH) may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region.

Using this subframe (or slot) structure reduces the time required for retransmitting data that has failed in reception, thereby minimizing overall data transmission latency. In such a self-contained subframe (or slot) structure, a time gap may be required for transitioning between a transmission mode and a reception mode or from the reception mode to the transmission mode. To accommodate this, a few OFDM symbols when switch from DL to UL in the subframe structure may be configured to a guard period (GP).

Figure 6:
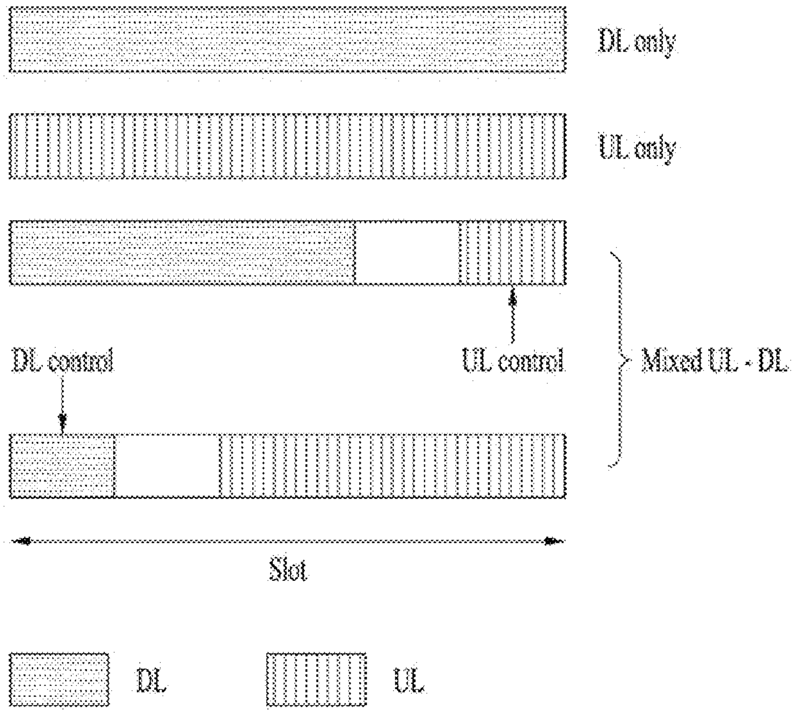
FIG. 6 illustrates a structure of a self-contained slot.

FIG. 6 Illustrates a Structure of a Self-Contained Slot.

In the NR system, the frames are structured as a self-contained structure, where one single slot includes a DL control channel, either a DL or UL data channel, and UL control channel. For example, the first N symbols in a slot may be used for transmitting a DL control channel and referred to as a DL control region. The last M symbols in the slot may be used for transmitting an UL control channel and referred to as a UL control region. N and M are integers greater than 0. A resource region between the DL control region and the UL control region may be used for either DL data transmission or UL data transmission and referred to as a data region.

For example, the following configurations may be considered. The durations are listed in temporal order.

1. DL only configuration
2. UL only configuration
3. Mixed UL-DL configuration
    - DL region+Guard Period (GP)+UL control region
    - DL control region+GP+UL region
    - DL region: (i) DL data region, (ii) DL control region+DL data region
    - UL region: (i) UL data region, (ii) UL data region+UL control region A physical downlink control channel (PDCCH) may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Through the PDCCH, Downlink Control Information (DCI), for example, DL data scheduling information or UL data scheduling data may be transmitted. Through the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A guard period (GP) provides a time gap during a process where a gNB and a UE transition from the transmission mode to the reception mode or a process where the gNB and UE transition from the reception mode to the transmission mode. Some of symbols within a subframe that transition from DL to UL mode may be configured as the GP.

The present disclosure is to provide a transmission method and apparatus for controlling periodic uplink transmission in 3GPP NR. In particular, the disclosure aims to provide a control method and apparatus for enhancing utilization of transmission resources during configured grant (CG)-based transmission to increase the transmission capacity of an extended reality (XR) terminal.

3GPP NR defines CG-based transmission for periodic uplink transmission. The CG-based transmission is broadly classified into two primary types: Type 1 and Type 2. In common, a transmission resource type, a modulation and coding scheme (MCS) table, periodic and repeated transmission configuration, etc. are transmitted through a radio resource control (RRC) message/information of 'ConfiguredGrantConfig.' In the case of Type 1, information indicated by downlink control information (DCI), such as time and frequency resources, and MCS indices, are additionally configured based on the RRC message/information. Type 1 and Type 2 are divided according to whether information about transmission performed or not in an actually configured transmission area is transmitted again with the DCI. The transmissions based on the CG Type 1 are performed using previously configured time/frequency domains and MCS indices even when there is no activation DCI transmission. In the case of Type 2, the transmissions are performed using the activation DCI and the time/frequency domains and MCS indices configured for that DCI and are not performed when there is no corresponding DCI.

The CG described above is summarized as follows.

Type 1: An uplink grant of a certain period is provided by upper layer (RRC) signaling (configured without separate first layer signaling).

Type 2: The period of an upper grant is configured by upper layer (RRC) signaling, and an uplink grant is provided by signaling activation/deactivation of the CG configured through a PDCCH.

Figure 7:
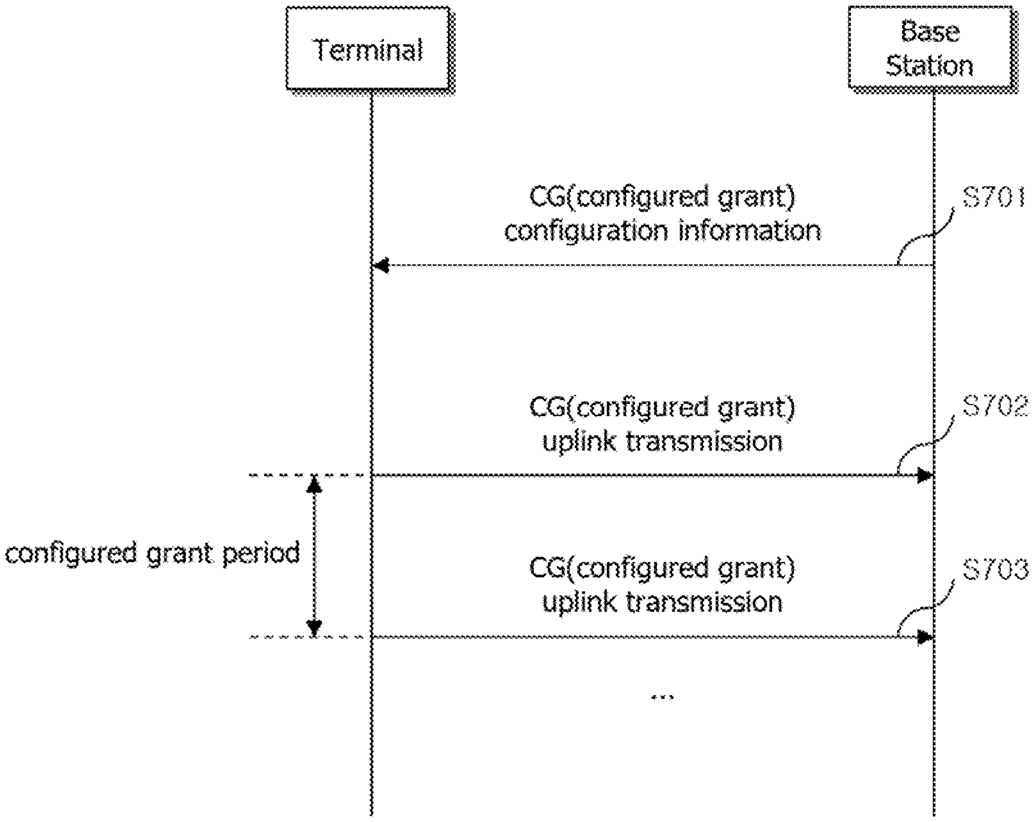
FIG. 7 illustrates exemplary uplink transmission and reception based on a configured grant (CG).

FIG. 7 Illustrates Exemplary Uplink Transmission and Reception Based on a Configured Grant (CG).

Referring to FIG. 7, a base station transmits CG configuration information to a terminal through RRC signaling (S701). The CG configuration information transmitted from the base station to the terminal may include period information for performing uplink transmission based on the CG. The terminal periodically performs the uplink transmission using the CG based on the period information included in the received CG configuration information (S702 to S703). Further, although not shown in FIG. 7, the CG uplink transmission may be repeatedly performed within the CG period. This may be based on information about the number of repetitions included in the CG configuration information.

The CG-based uplink transmission may correspond to CG transport block transmission. In the CG transport block transmission, control messages for transmitting information about HARQ ACK/NACK for downlink transmission, CSI feedback report, and configured grant-uplink control information (CG-UCI) may be sent as being multiplexed in a CG-PUSCH region. In particular, the control message for the HARQ ACK/NACK is allocated beginning with the first symbol after the first consecutive DMRS transmission symbol. The control message for the CG-UCI is allocated starting from the first symbol after the first consecutive DMRS transmission symbol except the HARQ control message. The CSI control message is allocated starting from the first symbol in the PUSCH region that does not transmit the DMRS, except the HARQ control message and the CG-UCI control message. The CG-UCI for the CG carries information as follows.

4 bits of HARQ process number
2 bits of redundancy version (RV)
1 bit of new data indicator (NDI)
Predefined bits of channel occupancy time (COT) sharing information for NR-unlicensed (U)

Meanwhile, as work items for NR Release 18, XR Enhancements for NR (NR_XR_Enh) for increasing the capacity according to service traffic characteristics of XR terminals are scheduled to be completed in December 2023, and those work items have objectives as shown in Table 5 below.

TABLE 5

| |
|---|
| 1 Specify the enhancements related to power saving: |
| DRX support of XR frame rates corresponding to non-integer periodicities (through at least semi-static mechanisms e.g. RRC signalling) (RAN2) |
| 2. Specify the enhancements related to capacity: |
| Multiple CG PUSCH transmission occasions in a period of a single CG PUSCH configuration (RAN1, RAN2); |
| Dynamic indication of unused CG PUSCH occasion(s) based on UCI by the UE (RAN1); |
| BSR enhancements including at least new BS Table(s); (RAN2); |
| Delay reporting of buffered data in uplink; (RAN2); |
| Provision of XR traffic assistance information for DL and UL (e.g. periodicity); (RAN2); |
| Discard operation of PDU Sets (RAN2); |
| 3. Specify the enhancements for XR Awareness (RAN2, RAN3): TBD (detailed objectives will be further clarified at RAN#99 based on the conclusions of TR38.835, and work to be started only after RAN#99) |

In the existing NR CG, only one transport block is designated per period. Configurations are predetermined based on data volume: a short period with a large transmission area is predefined for periods with a large average data amount, while a long period with a small transmission area is predefined for periods with a small average data amount. Furthermore, the existing NR CG performs the repeated transmission additionally a predefined number of times according to uplink channel environments. However, it struggles to handle a variable average transmission area such as a video stream of XR. Therefore, to address this issue, a method has been proposed that allows a single CG to secure multiple PUSCH transmission areas (see the objective 2 in Table 5, "Multiple CG PUSCH transmission occasions in a period of a single CG PUSCH configuration (RAN1, RAN2)")

However, this proposed method still faces challenges with dynamic reallocation when the previously allocated area is no longer needed. Therefore, another method has been proposed. This method allows a terminal to indicate an area, which parts of the previously allocated areas are not being used for actual transmission, so these areas can be repurposed for other transmission (see the objective 2 in Table 5, "Dynamic indication of unused CG PUSCH occasion(s) based on UCI by the UE (RAN)").

In this regard, several options have been discussed at the standardization meeting, but specifics (e.g., transmission methods, formats, etc.) have not yet been defined.

Accordingly, the disclosure introduces a method and apparatus for configuring the UCI to indicate the transmission of the unused PUSCH information (e.g., the unused transmission occasions of the CG PUSCH) by an actual terminal when multiple CG PUSCH transmissions are set up for CG-based transmission in an NR uplink transmission environment. In particular, the disclosure introduces a method and apparatus for determining a resource area for the UCI for indicating the unused transmission occasions of the CG PUSCH.

Meanwhile, in the present disclosure, the UCI for indicating the unused transmission occasions of the PUSCH is referred to as "unused transmission occasion (UTO)-UCI".

Figure 8:
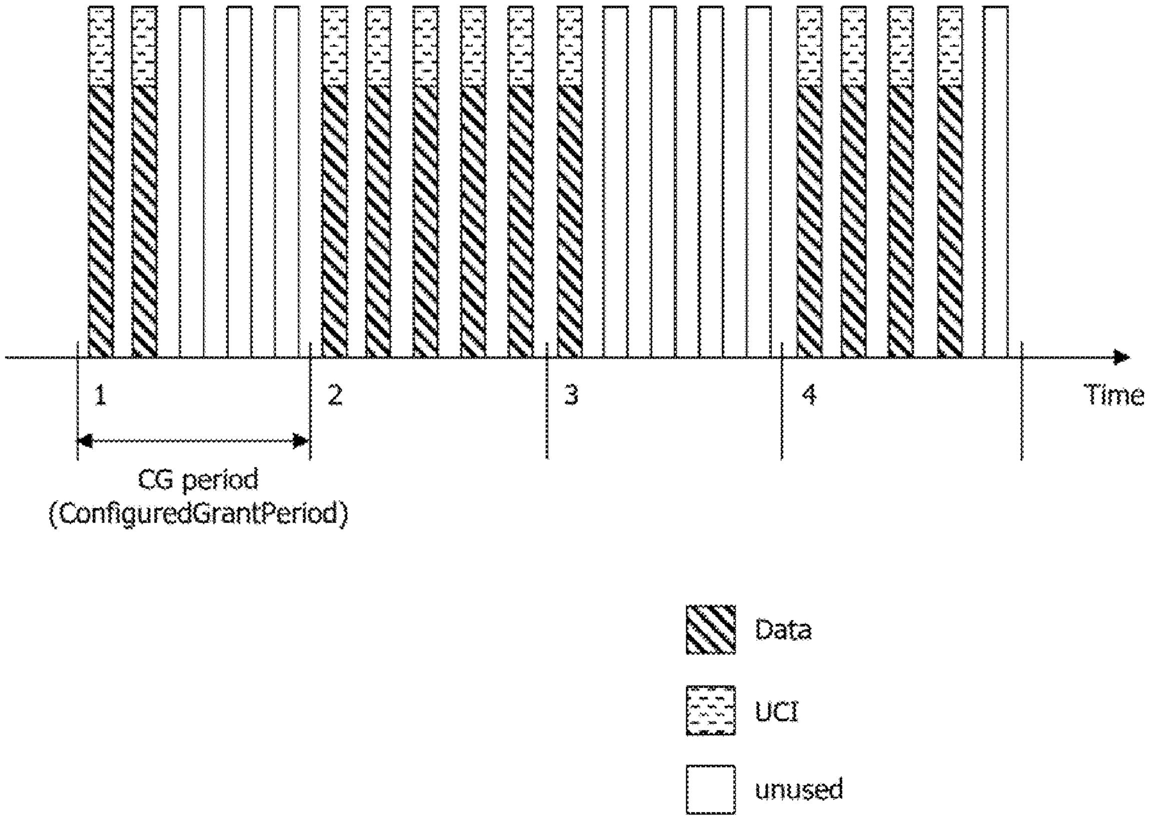
FIG. 8 illustrates exemplary uplink transmission and reception based on a CG according to an embodiment of the disclosure.

FIG. 8 Illustrates Exemplary Uplink Transmission and Reception Based on a CG According to the Disclosure of the Present Specification.

Referring to FIG. 8, uplink transmission (e.g., CG-PUSCH transmission) is performed based on a configured grant period (ConfiguredGrantPeriod). Here, the UCI (or CG-UCI) may be transmitted as multiplexed or piggybacked in a resource (or grant) for CG-PUSCH transmission. FIG. 8 illustrates five transmission occasions per CG period. Among the five transmission occasions, some transmission occasions may remain unused and not be utilized for transmission. For example, FIG. 8 shows three unused transmission occasions within the first CG period, no unused transmission occasions within the second CG period, four unused transmission occasions within the third CG period, and one unused transmission occasion within the fourth CG.

In the disclosure, the UCI indicating the unused transmission occasion (UTO) is referred as the UTO-UCI, although it may also be known by other name that convey the same technical meaning. Further, in the disclosure, the term 'transmission' occasion (TO) may be used interchangeably with 'occasion' to signify the same concept.

Meanwhile, CG period information and information about the number of transmission occasions within the CG period may be included in CG configuration information transmitted to the terminal by the base station. Here, the CG configuration information may be transmitted to the terminal through a radio resource control (RRC) message/information. Although not shown in FIG. 8, each transmission occasion within one CG period may be subject to repetitive transmissions, based on specified information regarding the number of repetitions. The information about the number of repetitions may also be included in the CG configuration information that the base station transmits to the terminal, as described above.

Hereinafter, embodiments will be described in detail.

The disclosure introduces a method of determining a resource location for UTO-UCI transmission. Specifically, methods are provided for determining resource locations (1)

when the corresponding UCI is transmitted alone, (2) when the corresponding UCI is indicated to be transmitted together with HARQ or CG-UCI, (3) when the corresponding UCI is indicated to be transmitted together with CSI feedback, and (4) on the second and subsequent occasions.

During PUSCH transmission based on CG configured by the base station, the terminal may transmit the UTO-UCI as multiplexed with uplink data through allocated PUSCH transmission resources. In this case, the resource elements (RE) in the PUSCH transmission resources for the UTO-UCI transmission are determined by methods (to be described later), and the uplink data may be transmitted by rate matching or puncturing/overwriting through the remaining resources except the RE for the UCI transmission. To this end, the base station may configure or indicate a separate beta offset value for the UTO-UCI transmission.

Further, when the UTO-UCI and another UCI are simultaneously transmitted on a PUSCH transmission occasion within a CG, the base station may configure (e.g., determine) or indicate whether to perform multiplexing between that UTO-UCI and another UCI. Here, the multiplexing different types of UCI refers to the combining the different types of UCI in the form of concatenation in a payload domain. Such a combined payload is transmitted as encoded as one code block, unlike UCI multiplexing within PUSCH transmission resources.

Hereinafter, a method of configuring or indicating the multiplexing between the UTO-UCI and another UCI will be described in detail. Here, that the multiplexing is configured or indicated refers to that the multiplexing configuration information is transmitted to the terminal by the base station through UE/cell-specific RRC signaling. Alternatively, the multiplexing indication information is transmitted to the terminal through medium access control (MAC) control element (CE) signaling or UE-specific/group-common downlink control information (DCI).

The base station may explicitly configure or indicate whether to multiplex the UTO-UCI with specific UCI. For example, the multiplexing between the UTO-UCI and HARQ-ACK/NACK may be configured (e.g., to be enabled or disabled) by the base station. Alternatively, the multiplexing between the UTO-UCI and the CG-UCI may be configured (e.g., to be enabled or disabled) by the base station. Alternatively, combination of the multiplexing between the UTO-UCI and the HARQ-ACK/NACK and the multiplexing between the UTO-UCI and the CG-UCI may be configured by the base station.

The base station may implicitly configure or indicate whether to multiplex the UTO-UCI with specific UCI. For example, whether to perform the multiplexing for the UTO-UCI may be determined based on the existing multiplexing configuration information between CG-UCI and a HARQ. Alternatively, whether to perform the multiplexing for the UTO-UCI may be determined based on combination of multiplexing configuration information between the corresponding CG-UCI and the HARQ, and pieces of UCI transmitted on a PUSCH transmission occasion.

Hereinafter, a method for multiplex the UTO-UCI with another UCI will be described in more detail.

First Embodiment: Upon Indicating the Multiplexing Between a HARQ and CG-UCI In the first embodiment, an indication message for indicating the multiplexing between the HARQ and the CG-UCI may also indicate whether to simultaneously perform the multiplexing for the UTO-UCI. In other words, the UTO-UCI may always be multiplexed with the HARQ and the CG-UCI.

Alternatively, t a new message may be introduced that is specifically used for multiplexing a different combination. The details are as follows.

- In the case where an indication message for indicating the multiplexing between the HARQ and the UTO-UCI is present and the multiplexing is indicated: three control messages, i.e., the HARQ, the CG-UCI and the UTO-UCI are multiplexed simultaneously/together. In this case, the beta offset, which is not indicated by the DCI or is indicated as semi-static, may be based on the beta offset of the HARQ, the bata offset of the UTO-UCI, a higher value between the beta offsets of the HARQ and the UTO-UCI, or the value of the beta offset of the HARQ or the UTO-UCI having a higher priority.
- In the case where an indication message for indicating the multiplexing between the HARQ and the UTO-UCI is present and the multiplexing is not indicated: only the HARQ and the CG-UCI are multiplexed. When the HARQ has a higher priority than or the same priority as the UTO-UCI, the UTO-UCI may not be transmitted in the corresponding transmission space or may be allocated earlier or later than the corresponding multiplexed-signal transmission resources.
- In the case where an indication message for indicating the multiplexing between the CG-UCI and the UTO-UCI is present and the multiplexing is indicated: three control messages, i.e., the HARQ, the CG-UCI and the UTO-UCI are multiplexed simultaneously/together. In this case, the beta offset, which is not indicated by the DCI or is indicated as semi-static, may be based on the beta offset of the HARQ, the bata offset of the UTO-UCI, a higher value between the beta offsets of the HARQ and the UTO-UCI, or the value of the beta offset of the HARQ or the UTO-UCI having a higher priority.
- In the case where an indication message for indicating the multiplexing between the CG-UCI and the UTO-UCI is present and the multiplexing is not indicated: only the HARQ and the CG-UCI are multiplexed. When the HARQ has a higher priority than or the same priority as the UTO-UCI, the UTO-UCI may not be transmitted in the corresponding transmission space or may be allocated earlier or later than the corresponding multiplexed-signal transmission resources.

Second Embodiment: Upon Indicating No Multiplexing Between a HARQ and CG-UCI In the second embodiment, when the multiplexing between the HARQ and the CG-UCI is not indicated, the HARQ, the CG-UCI, and the UTO-UCI may always be individually transmitted regardless of whether an indication message for indicating the multiplexing between the HARQ and the UTO-UCI or an indication message for indicating the multiplexing between the CG-UCI and the UTO-UCI is present or indicated, or the multiplexing between the HARQ and the UTO-UCI or the multiplexing between the CG-UCI and the UTO-UCI may be performed unconditionally.

- In the case where an indication message for indicating the multiplexing between the HARQ and the UTO-UCI is present and the multiplexing is indicated: the HARQ and the UTO-UCI are multiplexed. In this case, the beta offset, which is not indicated by the DCI or is indicated as semi-static, may be based on the beta offset of the HARQ, the bata offset of the UTO-UCI, a higher value between the beta offsets of the HARQ and the UTO-UCI, or the value of the beta offset of the HARQ or the UTO-UCI having a higher priority. In addition, the CG-UCI may be allocated with a resource space except the resource space allocated to a multiplexing control message and may be dropped not to be transmitted.

In the case where an indication message for indicating the multiplexing between the HARQ and the UTO-UCI is present and the multiplexing is not indicated: all three control messages, i.e., the HARQ, the CG-UCI and the UTO-UCI are not multiplexed. Further, when the HARQ has a higher priority than or the same priority as the UTO-UCI, the UTO-UCI may not be transmitted in the corresponding transmission space or may be allocated earlier or later than the corresponding multiplexed-signal transmission resources. Further, when the HARQ has a lower priority than or the same priority as the UTO-UCI, the HARQ may not be transmitted in the corresponding transmission space or may be allocated earlier or later than the corresponding multiplexed-signal transmission resources.

In the case where an indication message for indicating the multiplexing between the CG-UCI and the UTO-UCI is present and the multiplexing is indicated: the CG-UCI and the UTO-UCI are multiplexed. In this case, the beta offset, which is not indicated by the DCI or is indicated as semi-static, may be based on the beta offset of the CG-UCI, the bata offset of the UTO-UCI, a higher value between the beta offsets of the HARQ and the UTO-UCI, or the value of the beta offset of the HARQ or the UTO-UCI having a higher priority.

In the case where an indication message for indicating the multiplexing between the CG-UCI and the UTO-UCI is present and the multiplexing is not indicated: all three control messages, i.e., the HARQ, the CG-UCI and the UTO-UCI are not multiplexed. Further, when the HARQ has a higher priority than or the same priority as the UTO-UCI, the UTO-UCI may not be transmitted in the corresponding transmission space or may be allocated earlier or later than the corresponding multiplexed-signal transmission resources. Further, when the HARQ has a lower priority than or the same priority as the UTO-UCI, the HARQ may not be transmitted in the corresponding transmission space or may be allocated earlier or later than the corresponding multiplexed-signal transmission resources.

Third Embodiment: Upon Introducing an Integrated Multiplexing Indication Message In the third embodiment, the field of the existing 'cg-UCI-Multiplexing' message is expanded so that one message can indicate whether to perform each multiplexing for the HARQ, the CG-UCI and the UTO-UCI. The operations based on each indication may be the same as the operations based on the individual messages according to the first disclosure and/or the second disclosure. However, to reduce the number of message bits, the corresponding message according to the third embodiment may make an indication in an enumerated form excluding a certain combination from the followings:

1. HARQ & CG-UCI
2. HARQ & UTO-UCI
3. CG-UCI & UTO-UCI

For example, it may not be involved that '1' (1. HARQ & CG-UCI) is configured as 'disable' and '2' (2. HARQ & UTO-UCI) is configured as 'enable'. In more detail, 'enabled' and 'disabled' may be defined as follows. Here, '0' is configured as 'disabled,' and '1' is configured as 'enabled.'

First example: {enabled}
Second example: {000, 100, 111}
Third example: {000, 001, 100, 111}
Fourth example: {000, 010, 100, 111}
Fifth example: {000, 001, 010, 100, 111}
Sixth example: {000, 001, 010, 100, 011, 101, 110, 111}

The first example corresponds to a case that determines whether the HARQ, the CG-UCI, and the UTO-UCI are multiplexed simultaneously or not multiplexed at all. Operations based on two configured as 'enable' in the sixth example may be performed in such a manner that the multiplexing is performed only when two signals are present or the multiplexing is not performed only when only signal pairs configured as 'disable' are present.

Forth embodiment: How to determine the transmission resources of UTO-UCI

Hereinafter, methods of determining the transmission resources of the UTO-UCI in PUSCH transmission resources will be described in detail.

Method 1: How to Determine a Resource Location when the UTO-UCI is Transmitted Alone Method 1 refers to a method of determining the resource location when the UTO-UCI is the only UCI to be transmitted on a specific occasion. To this end, the following processes, i.e., operations of the method may be introduced.

Process 1 of Method 1: Determination of a Starting Symbol Location

A starting symbol location for allocating the UTO-UCI is determined in a UL-SCH. The starting symbol location may be the first symbol in a slot where DM-RS is not allocated, within the entire PUSCH area. Alternatively, the starting symbol location may be the first symbol in a slot where the DM-RS is not allocated after the first allocated DM-RS symbol. Alternatively, the starting symbol location may be a symbol at a predetermined location specified after the second standards rather than the first standards.

Process 2 of Method 1: RE Selection for Transmission

The location of an resource element (RE) to transmit the UTO-UCI is selected after the starting symbol. To this end, the selection may be performed from the first resource element (RE) among the resource elements (REs) allocated for PUSCH transmission at a transmission point in time. Alternatively, the frequency offsets for a start RE and an end RE may be configured in advance. The REs for transmitting the UTO-UCI are consecutively selected in sequence from the corresponding location until enough transmission space is secured to accommodate the length of a UTO-UCI code block, which is predetermined by the UTO-UCI beta offset.

Process 3 of Method 1: Determination of an Alternative Symbol Location

When the UTO-UCI is not entirely allocated even though all unallocated REs of the corresponding symbol are used in the process 2 of method 1, the next symbol is consecutively searched. In this case, a new RE location for the transmission may be selected from the first RE as described in the process 2 of method 1, from a configured offset, or by applying an offset or no offset from the second RE according to whether to apply the offset is changed, unlike the first RE.

Process 4 of Method 1: Transmission of Remaining Signals

Signals not used for the corresponding UTO-UCI transmission are employed for transmitting uplink data.

Method 2: How to Determine a Resource Location when the UTO-UCI is Transmitted Together with the HARQ or the CG-UCI Method 2 refers to a method of determining the resource location when the UCI to be transmitted on a specific occasion includes the HARQ and the CG-UCI in addition to the UTO-UCI. To this end, the following processes may be introduced. First, on the occasion where the corresponding signal transmission is indicated for the HARQ or the CG-UCI, or both the HARQ and the CG-UCI, 1) the UTO-UCI may not be transmitted, or
2) the UTO-UCI may not be transmitted when the multiplexing with the HARQ or the CG-UCI is not indicated.

Method(s) to be described later is related to the simultaneous transmission, and the multiplexing in the following method(s) means that one code block is generated and transmitted using the same error correction code after connection in a messaging stage, unless otherwise specified.

First, when the transmission of the UTO-UCI together with the HARQ is indicated:

Process 1 of Method 2: Determination of a Starting Symbol Location

The process 1 of method 2 is identical to the process 1 of method 1 described above. However, based on the presence of the HARQ, the starting symbol location may be selected differently when the HARQ is absent.

Process 2 of Method 2: RE Selection for Transmission

The location of an resource element (RE) to transmit the UTO-UCI is selected after the starting symbol. To this end, the selection for the UTO-UCI may be performed from the first RE among the REs allocated for PUSCH transmission at a transmission point in time. In this case, the selection for the HARQ may be performed from an RE unallocated for the UTO-UCI transmission among the REs allocated for the PUSCH transmission. Alternatively, the selection may be performed from the first RE among the REs that are not allocated for the HARQ. The REs for transmitting the UTO-UCI are consecutively selected in sequence from the corresponding location until the enough transmission space is secured to accommodate the length of a UTO-UCI code block configured in advance. The HARQ and the UTO-UCI may be multiplexed and transmitted simultaneously/together in the same resource space under the conditions that the HARQ and the uplink data have the same priority, the multiplexing is indicated in advance, the message field of the UTO-UCI satisfies a specific bit length condition, or two signals are simply indicated simultaneously. In other words, two messages may be simultaneously encoded by one beta offset as they are connected in the messaging stage.

Process 3 of Method 2: Determination of an Alternative Symbol Location

The process 3 of method 2 is identical to the process 2 of method 1 previously described.

Process 4 of Method 2: Transmission of Remaining Signals

The process 4 of method 2 is identical to the process 3 of method 1 described above. However, the HARQ may be allocated avoiding the area allocated to the UTO-UCI or may be overwritten in a previously reserved area.

When the transmission of the UTO-UCI together with the CG-UCI is indicated:

Process 5 of Method 2: Determination of a Starting Symbol Location

The process 5 of method 2 is identical to the process 1 of method 1 described above. However, based on the presence of the CG-UCI, the starting symbol location may be selected differently when the CG-UCI is absent.

Process 6 of Method 2: RE Selection for Transmission

The locations of REs to transmit the UTO-UCI are selected after the starting symbol. To this end, the selection for the UTO-UCI may be performed from the first RE among the REs allocated for PUSCH transmission at a transmission point in time. Alternatively, the selection may be performed from the first RE among the REs not allocated for the CG-UCI. The REs for transmitting the UTO-UCI are consecutively selected in sequence from the corresponding location until enough transmission space is secured to accommodate the length of a UTO-UCI code block configured in advance.

The CG-UCI and the UTO-UCI may be multiplexed and transmitted simultaneously/together in the same resource space under the conditions that the multiplexing is indicated through an RRC message/information in advance, the message field of the UTO-UCI satisfies a specific bit length condition, or two signals are simply indicated simultaneously. In other words, two messages may be simultaneously encoded by being linked together during the messaging stage. In this case, the beta offset, which is not indicated by the DCI or is indicated as semi-static, may be based on the beta offset of the CG-UCI, the bata offset of the UTO-UCI, a higher value between the beta offsets of the CG-UCI and the UTO-UCI, or a separate beta offset value for the multiplexing may be additionally configured.

Process 7 of Method 2: Determination of an Alternative Symbol Location

The process 7 of method 2 is identical to the process 2 of method 1 described above.

Process 8 of Method 2: Transmission of Remaining Signals

The process 8 of method 2 is identical to the process 3 of method 1 described above. However, when the CG-UCI has not been multiplexed with the UTO-UCI, the CG-UCI may be allocated before the UL-SCH avoiding the area allocated with the UTO-UCI or may be overwritten in a previously reserved area.

When the transmission of the UTO-UCI together with the HARQ and the CG-UCI is indicated:

Process 9 of Method 2: Determination of a Starting Symbol Location

The process 9 of method 2 is identical to the process 1 of method 1 described above. However, based on the presence of the HARQ or the CG-UCI, the starting symbol location may be selected differently when the HARQ or the CG-UCI is absent.

Process 10 of Method 2: RE Selection for Transmission

The locations of REs to transmit the UTO-UCI are selected after the starting symbol. To this end, the selection for the UTO-UCI may be performed from the first RE among the Res allocated for the UL-SCH at a transmission point in time. Alternatively, the selection may be performed from the first RE among the REs allocated for the HARQ. Alternatively, the selection may be performed from the first RE among the REs not allocated to the HARQ and the CG-UCI. The REs for transmitting the UTO-UCI are consecutively selected in sequence from the corresponding location until enough transmission space is secured to accommodate the length of a UTO-UCI code block configured in advance. The HARQ and the HARQ or the UTO-UCI may be multiplexed and transmitted simultaneously/together in the same resource space under the conditions that the HARQ and the uplink data have the same priority, the multiplexing between the HARQ and the UTO-UCI or between the CG-UCI and the UTO-UCI is indicated through the RRC message/information in advance, the message field of the UTO-UCI satisfies a specific bit length condition, or three signals are simply indicated simultaneously. In other words, two or more messages may be simultaneously encoded by being linked together during the messaging stage.

Process 11 of Method 2: Determination of an Alternative Symbol Location

The process 11 of method 2 is identical to the process 2 of method 1 described above.

Process 12 of Method 2: Transmission of Remaining Signals

The process 12 of Method 2 is identical to the process 3 of method 1 described above. However, the HARQ or the CG-UCI may be allocated avoiding the area allocated for the UTO-UCI or may be overwritten in a previously reserved area.

Method 3: How to Determine a Resource Location when it is Indicated to Transmit the UTO-UCI Together with Channel State Information (CSI) Feedback Method 3 refers to a method of determining the resource location when the UCI to be transmitted on a specific occasion includes the CSI feedback. To this end, the following processes may be introduced.

Process 1 of Method 3: Determination of a Starting Symbol Location

The process of method 3 is identical to the process 1 of method 1 described above. However, based on the presence of the CSI feedback, the starting symbol location may be selected differently when the CSI feedback is absent.

Process 2 of Method 3: RE Selection for Transmission

The location of an RE to transmit the UTO-UCI is selected after the starting symbol. To this end, the selection for the UTO-UCI may be performed from the first RE among the remaining REs except the REs previously indicated for other purposes than CG at a transmission point in time. Alternatively, the selection may be performed from the first RE among the REs not allocated to the CSI. The offset of the start RE may be configured in advance. The REs for transmitting the UTO-UCI are consecutively selected in sequence from the corresponding location until the transmission space is secured sufficiently. Whether to simultaneously transmit these signals may be varied depending on the priority of the HARQ and the configuration of 'UCI-MuxWithDifferentPriority.' If i) the corresponding operation is not configured ii) the priority of the HARQ is low, and iii) the UTO-UCI and the HARQ are multiplexed by the same code, the UTO-UCI and the HARQ may either not be transmitted or may be encoded together, excluding the message corresponding to the HARQ. Alternatively, when the UTO-UCI is multiplexed with the HARQ and the CG-UCI by the same code, all the UTO-UCI, the HARQ, and the CG-UCI may not be transmitted and may be encoded excluding the message corresponding to the HARQ or excluding the message corresponding to the HARQ and the CG-UCI.

Process 3 of Method 3: Determination of an Alternative Symbol Location

The process 3 of method 3 is identical to the process 2 of method 1 described above.

Process 4 of Method 3: Transmission of Remaining Signals

The process 4 of method 3 is identical to the process 3 of method 1 described above. However, the HARQ, the CG-UCI or the CSI feedback may be allocated based on allocation order avoiding the area allocated to the UTO-UCI or may be overwritten in a previously reserved area.

Method 4: How to Determine a Resource Location on the Second and Subsequent Occasions.

When the UTO-UCI is transmitted on multiple occasions within a period, the occasions may be different in whether to additionally include the HARQ, the CG-UCI, or the CSI feedback. In this case, when the UTO-UCI is allocated later than the preceding signals, i.e., the HARQ, the CG-UCI and the CSI feedback, the locations thereof may be varied depending on occasions when the foregoing methods are applied thereto. To prevent this, the UTO-UCI on the second and subsequent occasions may also be transmitted to the same location as that on the first occasion. This condition may be maintained only when the UTO-UCI is not multiplexed with the HARQ or the CG-UCI. When the UTO-UCI is transmitted as multiplexed with the HARQ or the CG-UCI, the multiplexing may be formed the same even on the second and subsequent occasions, and at this time the previous HARQ or CG-UCI bits may be applied as it is or padded with '0' or '1.'

The embodiments of the disclosure may be applied independently or in any combination. Additionally, new terms introduced in the disclosure are chosen for their clarity and ease of understanding. The content of the disclosure may remains applicable even if alternative terms with the same practical meanings are used.

Figure 9:
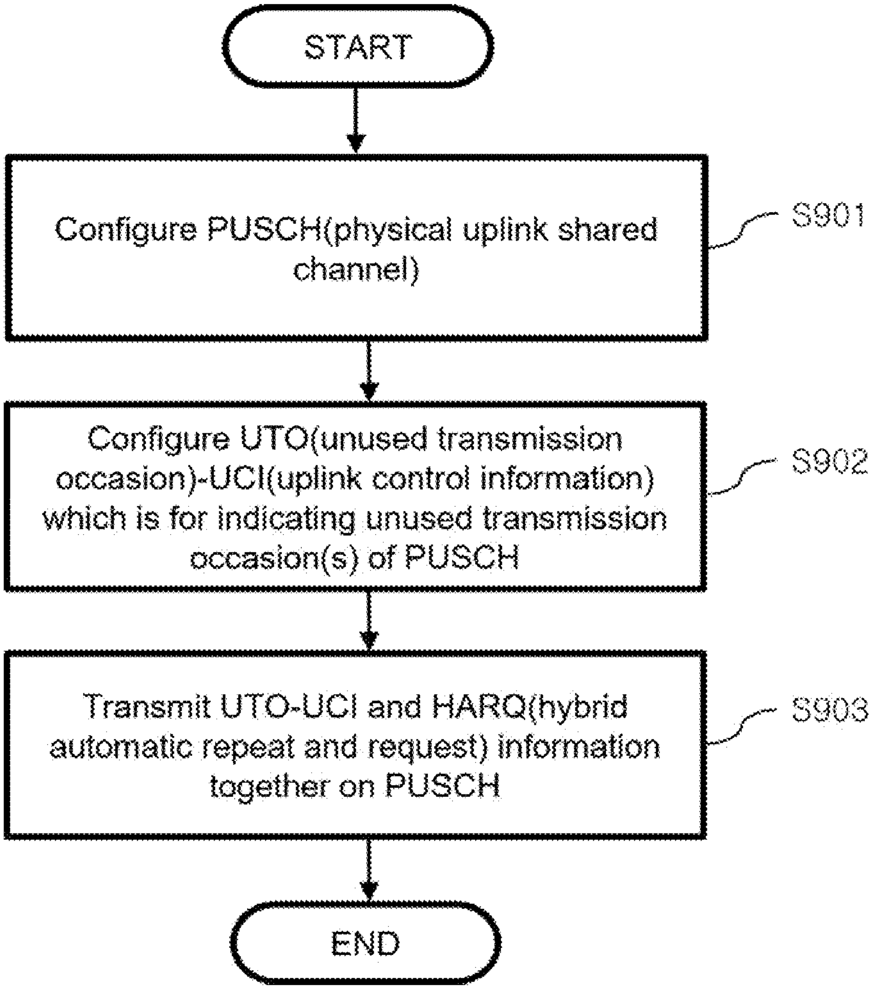
FIG. 9 is a flowchart for an operation method of a terminal according to an embodiment of the disclosure.

FIG. 9 is a Flowchart for an Operation Method of a Terminal According to an Embodiment of the Disclosure.

Referring to FIG. 9, the terminal configures a physical uplink shared channel (S901). Here, the PUSCH refers to a configured grant (CG) PUSCH. Further, the terminal configures unused transmission occasion (UTO)-uplink control information (UCI) for indicating an unused transmission occasion of the PUSCH (S902). The PUSCH and/or the UTO-UCI configured by the terminal may be based on the configuration information from the base station, and the configuration information from the base station may be CG configuration information (ConfiguredGrantConfig).

Then, the terminal transmits the UTO-UCI and the HARQ information together to the base station trough the PUSCH (S903). Here, the UTO-UCI and the HARQ information may be transmitted together based on a first priority of the HARQ information. Further, the uplink data may be transmitted together with the UTO-UCI and the HARQ information. Here, the HARQ information and the UTO-UCI may be transmitted by being encoded together.

Meanwhile, the UTO-UCI and the HARQ information may be transmitted together based on a second priority corresponding to at least one transmitted along with the HARQ. In other words, the UTO-UCI and the HARQ information may be transmitted together based on the priority (i.e., the second priority) of the uplink data and/or the UTO-UCI transmitted along with the HARQ information. In other words, the UTO-UCI and the HARQ information may be transmitted in consideration of the second priority in addition to the first priority. Here, the first priority may be the same as the second priority.

The UTO-UCI may be sequentially allocated to the resources of the first symbol in a slot where a demodulation-reference signal (DM-RS) is not allocated, within the PUSCH transmission space. If no resources remains in the first symbol, the allocation of the UTO-UCI may continue consecutively to resources of at least one next symbol, also where the DR-RS is not allocated. In addition, the uplink data may be allocated to resources other than those allocated to the DM-RS and the UTO-UCI.

In the present disclosure, the transmission of two or more signals/pieces of information/messages together may indicate that two or more signals/pieces of information/messages are multiplexed and transmitted simultaneously/together to the same resource space. Further, it may also mean that two or more signals/pieces of information/messages are encoded simultaneously/together using one beta offset.

Figure 10:
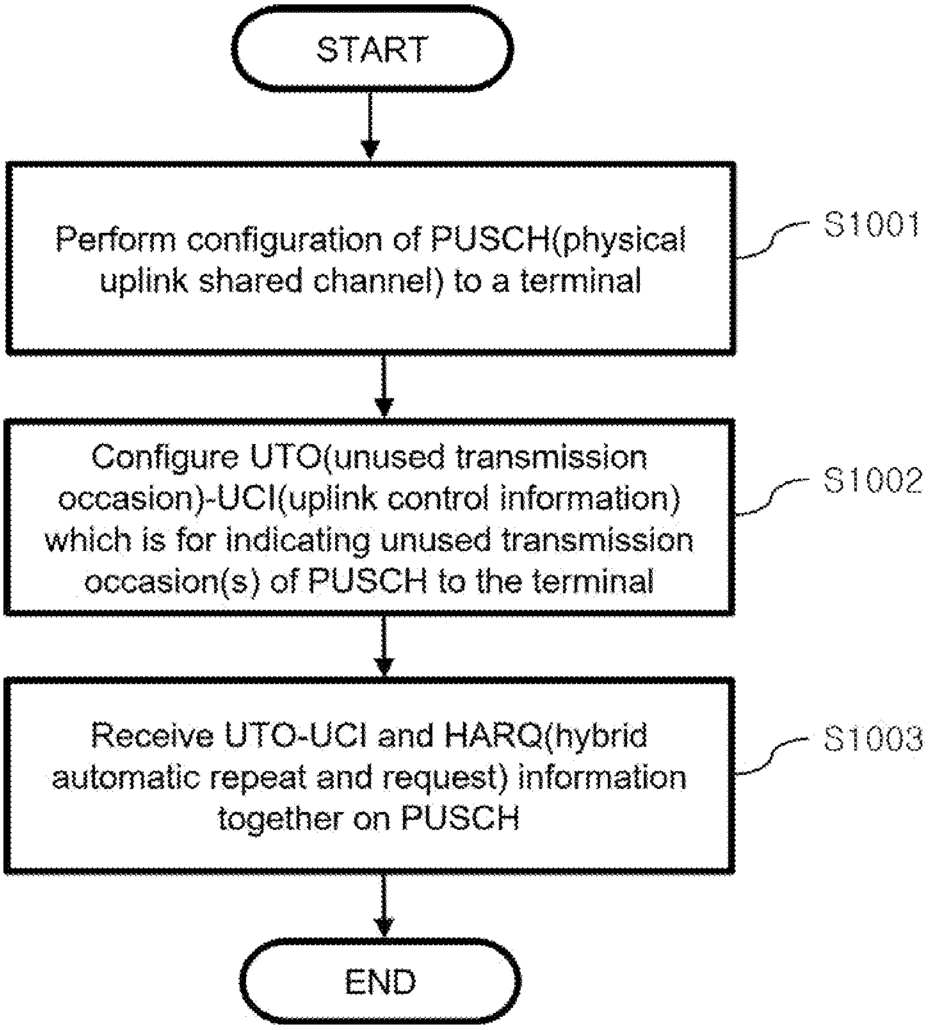
FIG. 10 is a flowchart for an operation method of a base station according to an embodiment of the disclosure.

FIG. 10 is a Flowchart for an Operation Method of a Base Station According to an Embodiment of the Disclosure.

Referring to FIG. 10, the base station performs configuration for a physical uplink shared channel to the terminal (S1001). Here, the PUSCH refers to a configured grant (CG) PUSCH. Further, the base station configures unused transmission occasion (UTO)-uplink control information (UCI) for indicating an unused transmission occasion of the PUSCH to the terminal (S1002). The PUSCH and/or the UTO-UCI configured by the base station to the terminal may be based on the configuration information from the base station, and the configuration information from the base station may be CG configuration information ConfiguredGrantConfig.

Then, the base station receives the UTO-UCI and the HARQ information together from the terminal trough the PUSCH (S1003). Here, the UTO-UCI and the HARQ information may be received together based on a first priority of the HARQ information. Further, the uplink data may be received together with the UTO-UCI and the HARQ information. Here, the HARQ information and the UTO-UCI may be received as encoded together.

Meanwhile, the UTO-UCI and the HARQ information may be received together based on a second priority corresponding to at least one received along with the HARQ. In other words, the UTO-UCI and the HARQ information may be received together based on the priority (i.e., the second priority) of the uplink data and/or the UTO-UCI received along with the HARQ information. In other words, the UTO-UCI and the HARQ information may be received in consideration of the second priority in addition to the first priority. Here, the first priority may be the same as the second priority.

The UTO-UCI may be sequentially allocated to the resources of the first symbol in a slot where a demodulation-reference signal (DM-RS) has not been allocated, within the PUSCH transmission space. If no resources remain in the first symbol, the allocation may continue consecutively allocated to resources of at least one subsequent symbol, where the DR-RS is not allocated. In addition, the uplink data may be allocated to resources other than the resources allocated to the DM-RS and the UTO-UCI.

In the present disclosure, receiving two or more signals/pieces of information/messages together may mean that two or more signals/pieces of information/messages are multiplexed and transmitted simultaneously/together to the same resource space. Further, it may also mean that two or more signals/pieces of information/messages are encoded simultaneously/together using one beta offset.

The embodiments may be implemented through various means. For example, the embodiments may be implemented by hardware, firmware, software, or a combination thereof. Details will be described with reference to the accompanying drawings.

Figure 11:
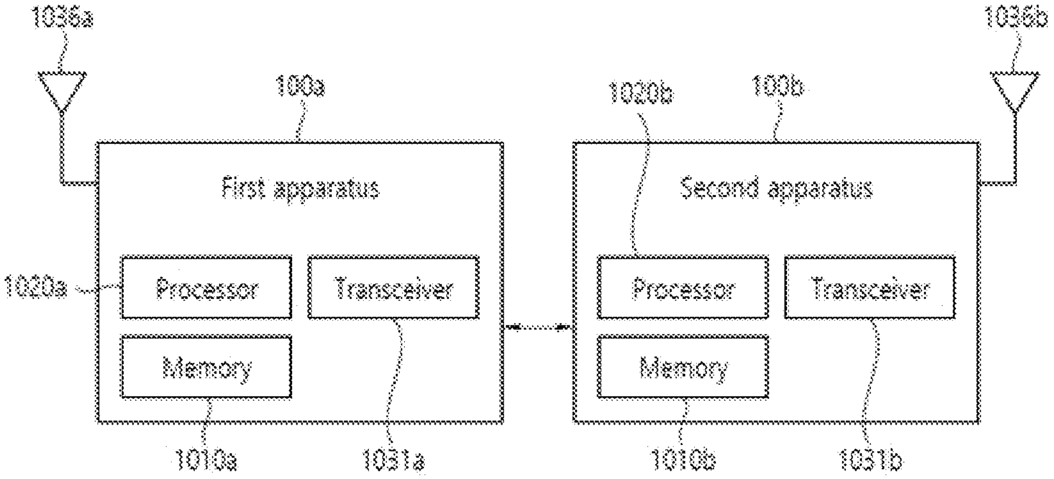
FIG. 11 is a block diagram showing apparatuses according to an embodiment of the disclosure.

FIG. 11 is a Block Diagram Showing Apparatuses According to an Embodiment of the Disclosure.

Referring to FIG. 11, a wireless communication system may include a first apparatus 100*a* and a second apparatus 100*b*.

The first apparatus 100*a* may include a base station, a network node, a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medial apparatus, a finance technology (FinTech) apparatus (or a financial apparatus), a security apparatus, a climate/environment apparatus, an apparatus related to a 5G service, or other apparatuses related to the fourth industrial revolution.

The second apparatus 100*b* may include a base station, a network node, a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medial apparatus, a finance technology (FinTech) apparatus (or a financial apparatus), a security apparatus, a climate/environment apparatus, an apparatus related to a 5G service, or other apparatuses related to the fourth industrial revolution.

The first apparatus 100*a* may include at least one processor such as a processor 1020*a*, at least one memory such as a memory 1010*a*, and at least one transceiver such as a transceiver 1031*a*. The processor 1020*a* may be tasked with executing the previously mentioned functions, procedures, and/or methods. The processor 1020*a* may be capable of implementing one or more protocols. For example, the processor 1020*a* may perform and manage one or more layers of a radio interface protocol. The memory 1010*a* may be connected to the processor 1020*a*, and configured to store various types of information and/or instructions. The transceiver 1031*a* may be connected to the processor 1020*a*, and controlled to transceive radio signals.

The second apparatus 100*b* may include at least one processor such as a processor 1020*b*, at least one memory device such as a memory 1010*b*, and at least one transceiver such as a transceiver 1031*b*. The processor 1020*b* may be tasked with executing the previously mentioned functions, procedures, and/or methods. The processor 1020*b* may be capable of implementing one or more protocols. For example, the processor 1020*b* may manage one or more layers of a radio interface protocol. The memory 1010*b* may be connected to the processor 1020*b* and configured to store various types of information and/or instructions. The transceiver 1031*b* may be connected to the processor 1020*b* and controlled to transceive radio signaling.

The memory 1010*a* and/or the memory 1010*b* may be respectively connected inside or outside the processor 1020*a* and/or the processor 1020*b* and connected to other processors through various technologies such as wired or wireless connection.

The first apparatus 100*a* and/or the second apparatus 100*b* may have one or more antennas. For example, an antenna 1036*a* and/or an antenna 1036*b* may be configured to transceive a radio signal.

Figure 12:
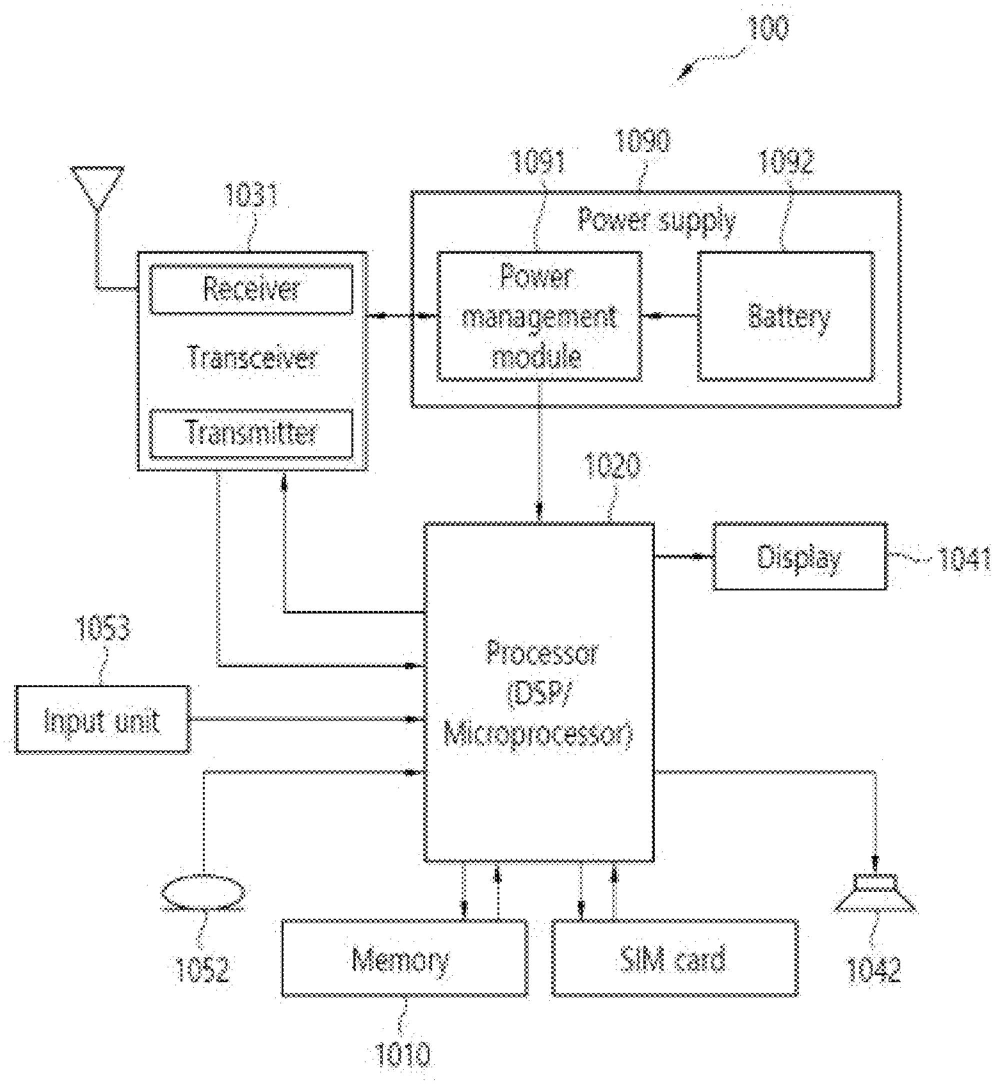
FIG. 12 is a block diagram showing a terminal according to an embodiment of the disclosure.

FIG. 12 is a Block Diagram Showing a Terminal According to an Embodiment of the Disclosure.

In particular, FIG. 12 illustrates the previously described apparatus of FIG. 11 in more detail.

The apparatus includes a memory 1010, a processor 1020, a transceiving unit 1031 (e.g., transceiving circuit), a power management module 1091 (e.g., power management circuit), a battery 1092, a display 1041, an input unit 1053 (e.g., input circuit), a loudspeaker 1042, a microphone 1052, a subscriber identification module (SIM) card, and one or more antennas. Some of constituent elements is referred to as a unit in the disclosure. However, the embodiments are not limited thereto. For example, such term "unit" is also referred to as a circuit block, a circuit, or a circuit module.

The processor 1020 may be configured to implement the proposed functions, procedures, and/or methods described in the disclosure. The layers of the radio interface protocol may be implemented in the processor 1020. The processor 1020 may include an application-specific integrated circuit (ASIC), other chipsets, logic circuits, and/or data processing devices. The processor 1020 may be an application processor (AP). The processor 1020 may include at least one of a digital signal processor (DSP), a central processing unit (CPU), a graphics processing unit (GPU), and a modulator and demodulator (MODEM). For example, the processor 1020 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel®, KIRIN™ series of processors made by HiSilicon®, or the corresponding next-generation processors.

The power management module 1091 manages a power for the processor 1020 and/or the transceiver 1031. The battery 1092 supplies power to the power management module 1091. The display 1041 outputs the result processed by the processor 1020. The input unit 1053 may be an individual circuit that receives an input from a user or other devices and convey the received input with associated information to the processor 1020. However, the embodiments are not limited thereto. For example, the input unit 1053 may be implemented as at least one of touch keys or buttons to be displayed on the display 1041 when the display 1041 is capable of sensing touches, generating related signals according to the sensed touches, and transferring the signals to the processor 1020. The SIM card is an integrated circuit used to securely store international mobile subscriber identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include read-only memory (ROM), random access memory (RAM), flash memory, a memory card, a storage medium, and/or other storage device. The embodiments described in the disclosure may be implemented as software program or application. In this case, such software program or application may be stored in the memory 1010. In response to a predetermined event, the software program or application stored in the memory 1010 may be fetched and executed by the processor 1020 for performing the function and the method described in this disclosure. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020, receives, and transmits a radio signal under control of the processor 1020. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives audio input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 for a user's recognition or for convenience.

Figure 13:
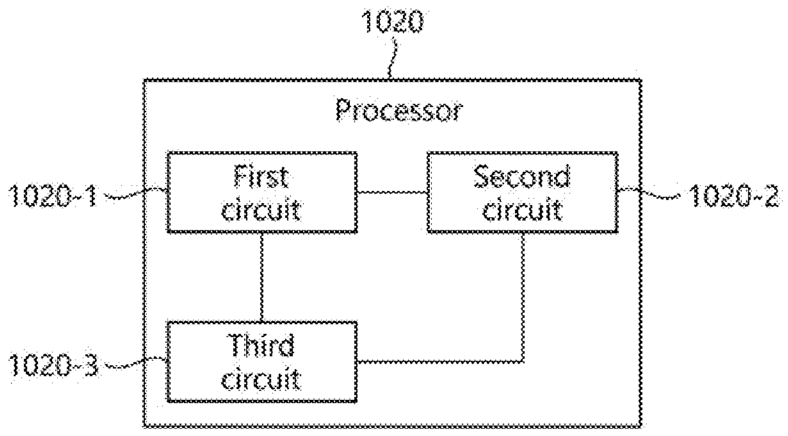
FIG. 13 is a block diagram of a processor in accordance with an embodiment.

FIG. 13 is a Block Diagram of a Processor in Accordance with an Embodiment.

Referring to FIG. 13, a processor 1020 may include a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an application-specific integrated circuit (ASIC) or an application processor (AP) and may include at least one of a digital signal processor (DSP), a central processing unit (CPU), and a graphics processing unit (GPU).

Figure 14:
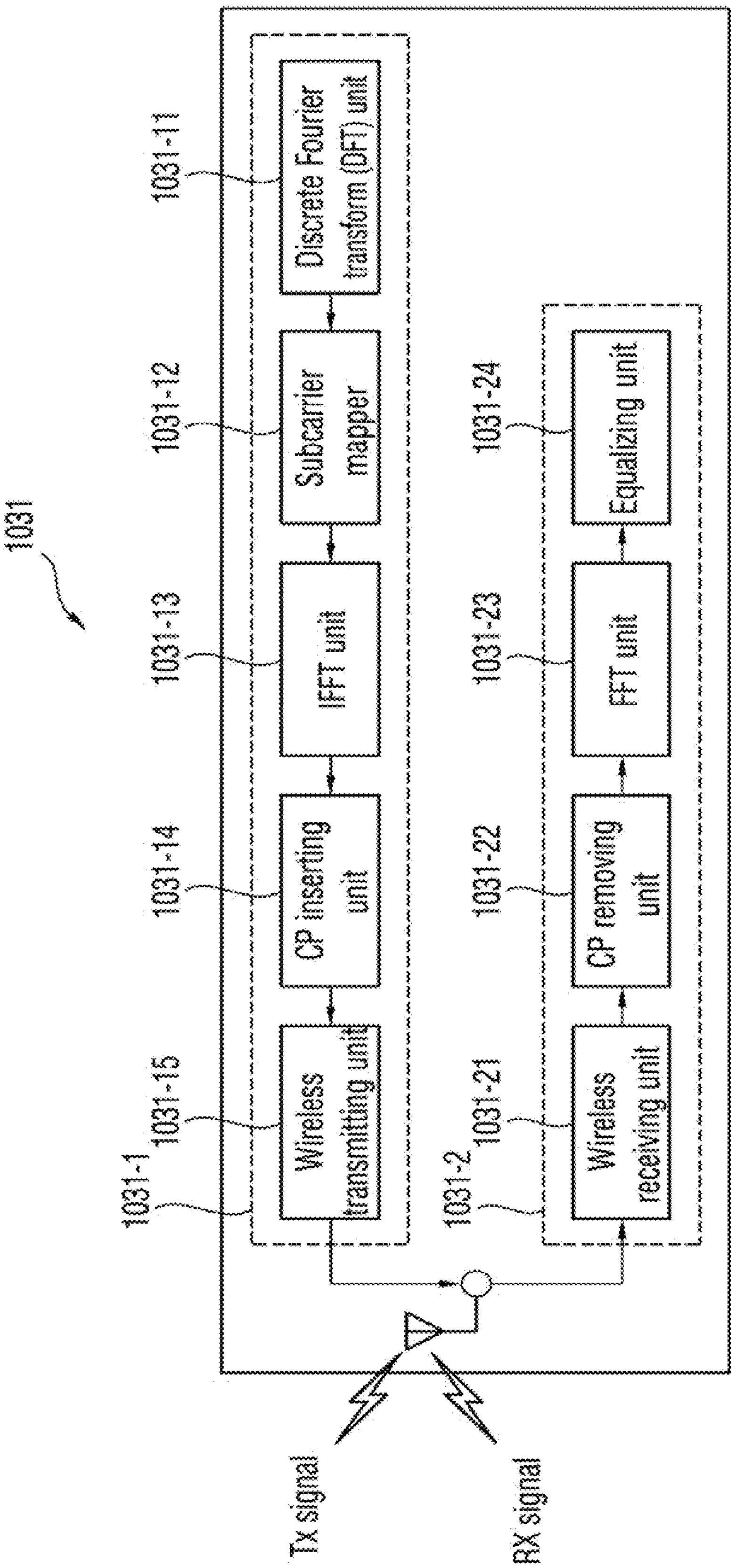
FIG. 14 is a detailed block diagram of a transceiver of a first apparatus shown in FIG. 11 or a transceiving unit of an apparatus shown in FIG. 12.

FIG. 14 is a Detailed Block Diagram of a Transceiver of a First Apparatus Shown in FIG. 11 or a Transceiving Unit of an Apparatus Shown in FIG. 12.

Referring to FIG. 14, the transceiving unit 1031 (e.g., transceiving circuit) includes a transmitter 1031-1 and a receiver 1031-2. The transmitter 1031-1 includes a discrete Fourier transform (DFT) unit 1031-11 (e.g., DFT circuit), a subcarrier mapper 1031-12 (e.g., subcarrier mapping circuit), an IFFT unit 1031-13 (e.g., IFFT circuit), a cyclic prefix (CP) insertion unit 1031-14 (e.g., CP insertion circuit), and a wireless transmitting unit 1031-15 (e.g., wireless transmitting circuit). The transmitter 1031-1 may further include a modulator. Further, the transmitter 1031-1 may for example include a scramble unit (e.g., scrambling circuit), a modulation mapper, a layer mapper, and a layer permutator, which may be disposed before the DFT unit 1031-11. That is, to prevent a peak-to-average power ratio (PAPR) from increasing, the transmitter 1031-1 subjects information to the DFT unit 1031-11 before mapping a signal to a subcarrier. The signal spread (or pre-coded) by the DFT unit 1031-11 is mapped onto a subcarrier by the subcarrier mapper 1031-12 and made into a signal on the time axis through the IFFT unit 1031-13. Some of constituent elements is referred to as a unit in the disclosure. However, the embodiments are not limited thereto. For example, such term "unit" is also referred to as a circuit block, a circuit, or a circuit module.

The DFT unit 1031-11 performs DFT on input symbols to output complex-valued symbols. For example, when Ntx symbols are input (here, Ntx is a natural number), DFT has a size of Ntx. The DFT unit 1031-11 may be referred to as a transform precoder. The subcarrier mapper 1031-12 maps the complex-valued symbols onto respective subcarriers in the frequency domain. The complex-valued symbols may be mapped onto resource elements corresponding to resource blocks allocated for data transmission. The subcarrier mapper 1031-12 may be referred to as a resource element mapper. The IFFT unit 1031-13 performs IFFT on the input symbols to output a baseband signal for data as a signal in the time domain. The CP inserting unit 1031-14 copies latter part of the baseband signal for data and inserts the latter part in front of the baseband signal for data. CP insertion prevents inter-symbol interference (ISI) and inter-carrier interference (ICI), thereby maintaining orthogonality even in a multipath channel.

On the other hand, the receiver 1031-2 includes a wireless receiving unit 1031-21 (e.g., wireless receiving circuit), a CP removing unit 1031-22 (e.g., CP removing circuit), an FFT unit 1031-23 (e.g., FFT circuit), and an equalizing unit 1031-24 (e.g., equalizing circuit). The wireless receiving unit 1031-21, the CP removing unit 1031-22, and the FFT unit 1031-23 of the receiver 1031-2 perform reverse functions of the wireless transmitting unit 1031-15, the CP inserting unit 1031-14, and the IFFT unit 1031-13 of the transmitter 1031-1. The receiver 1031-2 may further include a demodulator.

According to the embodiments of the disclosure, the unused transmission occasion (UTO)-uplink control information (UCI) for indicating an unused transmission occasion of the physical uplink shared channel (PUSCH), the hybrid automatic repeat and request (HARQ) information, etc. are efficiently transmitted and received through the PUSCH in the wireless communication system.

Although the preferred embodiments of the disclosure have been illustratively described, the scope of the disclosure is not limited to only the specific embodiments, and the disclosure can be modified, changed, or improved in various forms within the spirit of the disclosure and within a category written in the claim.

In the above exemplary systems, although the methods have been described in the form of a series of steps or blocks, the disclosure is not limited to the sequence of the steps, and some of the steps may be performed in different order from other or may be performed simultaneously with other steps. Further, those skilled in the art will understand that the steps shown in the flowcharts are not exclusive and may include other steps or one or more steps of the flowcharts may be deleted without affecting the scope of the disclosure.

Claims of the present disclosure may be combined in various manners. For example, technical features of the method claim of the present disclosure may be combined to implement a device, and technical features of the device claim of the present disclosure may be combined to implement a method. In addition, the technical features of the method claim and the technical features of the device claim of the present disclosure may be combined to implement a device, and technical features of the method claim and the technical features of the device claim of the present disclosure may be combined to implement a method.

What is claimed is:

1. A method of a terminal for operating in a wireless communication system, the method comprising:

receiving configuration for a physical uplink shared channel (PUSCH);

generating unused transmission occasion (UTO)-uplink control information (UCI) for indicating an unused transmission occasion of the PUSCH; and transmitting the UTO-UCI and hybrid automatic repeat and request (HARQ) information together through the PUSCH, wherein the UTO-UCI and the HARQ information are transmitted together based on a first priority of the HARQ information and a second priority of the UTO-UCI, and wherein the first priority is the same as the second priority.

2. The method of claim 1, wherein uplink data is transmitted together with the UTO-UCI and the HARQ information.

3. The method of claim 2, wherein the UTO-UCI is sequentially allocated to resources of the first symbol in a slot where a demodulation-reference signal (DM-RS) is not allocated, within a transmission space allocated for the PUSCH, and, in an event that no resource remains in the first symbol, the allocation of the UTO-UCI continues consecutively to resources of at least one next symbol, where the DM-RS is not allocated, and the uplink data is allocated to resources other than the resources allocated to the DM-RS and the UTO-UCI.

4. The method of claim 1, wherein the HARQ information and the UTO-UCI are transmitted by being encoded together.

5. A method of a base station for operating in a wireless communication system, the method comprising:

performing configuration for a physical uplink shared channel (PUSCH) to a terminal;

configuring unused transmission occasion (UTO)-uplink control information (UCI) for indicating an unused transmission occasion of the PUSCH to the terminal; and receiving the UTO-UCI and hybrid automatic repeat and request (HARQ) information together through the PUSCH, wherein the UTO-UCI and the HARQ information are received together based on a first priority of the HARQ information and a second priority of the UTO-UCI, and wherein the first priority is the same as the second priority.

6. The method of claim 5, wherein uplink data is received together with the UTO-UCI and the HARQ information.

7. The method of claim 6, wherein the UTO-UCI is sequentially allocated to resources of the first symbol in a slot where a demodulation-reference signal (DM-RS) is not allocated, within a transmission space allocated for the PUSCH, and in an event that no resources remain in the first symbol, the allocation of the UTO-UCI continues consecutively to resources of at least one next symbol, where the DM-RS is not allocated, and the uplink data is allocated to resources other than the resources allocated to the DM-RS and the UTO-UCI.

8. The method of claim 5, wherein the HARQ information and the UTO-UCI are received by being encoded together.

9. A communication device in a wireless communication system, the apparatus comprising:

at least one processor; and at least one memory configured to store instructions and be operably electrically connectable to the at least one processor, wherein an operation performed based on the instruction executed by the at least one processor comprises:

receiving configuration for a physical uplink shared channel (PUSCH);

generating unused transmission occasion (UTO)-uplink control information (UCI) for indicating an unused transmission occasion of the PUSCH; and transmitting the UTO-UCI and hybrid automatic repeat and request (HARQ) information together through the PUSCH, wherein the UTO-UCI and the HARQ information are transmitted together based on a first priority of the HARQ information and a second priority of the UTO-UCI, and wherein the first priority is the same as the second priority.

10. The communication device of claim 9, wherein uplink data is transmitted together with the UTO-UCI and the HARQ information.

11. The communication device of claim 10, wherein the UTO-UCI is sequentially allocated to resources of the first symbol in a slot, where a demodulation-reference signal (DM-RS) is not allocated, within a transmission space allocated for the PUSCH, and in an event that no resources remain in the first symbol, the allocation of the UTO-UCI continues consecutively to resources of at least one next symbol where the DM-RS is not allocated, and the uplink data is allocated to resources except the resources to which the DM-RS and the UTO-UCI are allocated.

12. The communication device of claim 9, wherein the HARQ information and the UTO-UCI are transmitted by being encoded together.

* * * * *